US012759152B2

(12) United States Patent
Hashiguchi et al.

(10) Patent No.: US 12,759,152 B2
(45) Date of Patent: Oct. 13, 2026

(54) SIMULATED COLLABORATION OF MULTIPLE CONTROLLERS

(71) Applicant: KABUSHIKI KAISHA YASKAWA DENKI, Kitakyushu (JP)

(72) Inventors: Yukio Hashiguchi, Fukuoka (JP); Yoshifumi Onoyama, Fukuoka (JP); Koichi Kuwahara, Fukuoka (JP); Naoki Utsumi, Fukuoka (JP)

( * ) Notice: Subject to any disclaimer, the term of this patent is extended or adjusted under 35 U.S.C. 154(b) by 917 days.

(21) Appl. No.: 18/068,534

(22) Filed: Dec. 20, 2022

(65) Prior Publication Data

US 2023/0121498 A1 Apr. 20, 2023

Related U.S. Application Data

(63) Continuation of application No. PCT/JP2021/008011, filed on Mar. 2, 2021.

(60) Provisional application No. 63/042,566, filed on Jun. 23, 2020.

(51) Int. Cl.
*B25J 9/16* (2006.01)
*G05B 19/4069* (2006.01)

(52) U.S. Cl.
CPC ........ *B25J 9/1671* (2013.01); *G05B 19/4069* (2013.01); *G05B 2219/33274* (2013.01)

(58) Field of Classification Search
CPC ............... B25J 9/1671; G05B 19/4069; G05B 2219/33274
USPC ............................................................ 703/19
See application file for complete search history.

(56) References Cited

U.S. PATENT DOCUMENTS

| | | | | |
|---|---|---|---|---|
| 12,216,460 | B2 * | 2/2025 | Lutz | G05B 19/4185 |
| 2015/0379171 | A1 | 12/2015 | Kuwahara | |
| 2016/0300000 | A1 | 10/2016 | Takeshita | |
| 2017/0193137 | A1 | 7/2017 | Li et al. | |
| 2017/0236262 | A1 | 8/2017 | Ohnuki et al. | |
| 2018/0178379 | A1 | 6/2018 | Takeda | |
| 2018/0236657 | A1 | 8/2018 | Kuwahara et al. | |

(Continued)

FOREIGN PATENT DOCUMENTS

| | | |
|---|---|---|
| CN | 105291107 | 2/2016 |
| CN | 105765468 | 7/2016 |

(Continued)

OTHER PUBLICATIONS

Office Action issued in Chinese Patent Application No. 202180044241.4, dated Apr. 23, 2024 (with English partial translation).

(Continued)

*Primary Examiner* — Tiffany P Young
(74) *Attorney, Agent, or Firm* — SHIPWAY IP

(57) ABSTRACT

A simulation device includes circuitry configured to: execute a first simulation of a first control of a first machine, wherein the first control is executed by a first controller; execute a second simulation of a second control of a second machine, wherein the second control is executed by a second controller so that the second machine operates in collaboration with the first machine; and control progress of the first simulation and progress of the second simulation to maintain a simulated ratio of a progress speed of the first simulation and a progress speed of the second simulation to be equal to a ratio of a progress speed of the first control and a progress speed of the second control.

20 Claims, 15 Drawing Sheets

(56) References Cited

U.S. PATENT DOCUMENTS

| | | | | |
|---|---|---|---|---|
| 2019/0005167 | A1 | 1/2019 | Laemmle | |
| 2019/0286117 | A1 | 9/2019 | Tanaka et al. | |
| 2020/0101601 | A1 | 4/2020 | Zhuo et al. | |
| 2020/0249663 | A1* | 8/2020 | Liu | G05B 19/41885 |
| 2021/0138651 | A1 | 5/2021 | Mcgregor et al. | |
| 2023/0079780 | A1 | 3/2023 | Oya et al. | |

FOREIGN PATENT DOCUMENTS

| | | |
|---|---|---|
| CN | 108241336 | 7/2018 |
| CN | 110234473 | 9/2019 |
| CN | 110967992 | 4/2020 |
| CN | 112783018 | 5/2021 |
| CN | 115023673 | 9/2022 |
| EP | 3467603 | 4/2019 |
| JP | 2000-330970 | 11/2000 |
| JP | 2001-282327 | 10/2001 |
| JP | 2004-038785 | 2/2004 |
| JP | 2005-014150 | 1/2005 |
| JP | 2007-233930 | 9/2007 |
| JP | 2009-037329 | 2/2009 |
| JP | 2015-032120 | 2/2015 |
| JP | 5996125 | 9/2016 |
| JP | 2017-094407 | 6/2017 |
| JP | 2018-134703 | 8/2018 |
| JP | 2019-159843 | 9/2019 |
| WO | 2015/079503 | 6/2015 |
| WO | 2017/117546 | 7/2017 |
| WO | 2021/166398 | 8/2021 |

OTHER PUBLICATIONS

Extended Search Report in corresponding European Application No. 21829261.3, dated May 22, 2024.

International Search Report dated May 18, 2021 for PCT/JP2021/008011.

International Preliminary Report on Patentability with Written Opinion dated Jan. 5, 2023 for PCT/JP2021/008011.

Office Action issued in Japanese Patent Application No. P2022-532294 dated Aug. 8, 2023 (with English partial translation).

Office Action issued in Japanese Patent Application No. P2023-206421, dated Apr. 22, 2025 (with English partial translation).

* cited by examiner

Fig.7

160

| 161 TRANSMISSSION SIDE | | 162 RECEPTION SIDE | | 163 VIRTUAL DELAY TIME |
|---|---|---|---|---|
| SIMULATOR | ADDRESS | SIMULATOR | ADDRESS | |
| 101 | 0×000 | 102A | 0×100 | 6ms |
| | 0×001 | | 0×101 | 8ms |
| | 0×011 | 102B | 0×200 | 6ms |
| | 0×012 | | 0×201 | 4ms |
| 102B | 0×111 | 101 | 0×021 | 4ms |
| | 0×112 | | 0×022 | 4ms |
| 102C | 0×211 | | 0×031 | 6ms |
| | 0×212 | | 0×032 | 8ms |

SIMULATED COLLABORATION OF MULTIPLE CONTROLLERS

CROSS-REFERENCE TO RELATED APPLICATIONS

This application is a continuation application of PCT Application No. PCT/JP2021/008011, filed on Mar. 2, 2021, which claims the benefit of priority from U.S. Provisional Patent Application No. 63/042,566, filed on Jun. 23, 2020. The entire contents of the above listed PCT and priority applications are incorporated herein by reference.

BACKGROUND

Field

The present disclosure relates to a simulation device, a control system, a simulation method, and a non-transitory memory device.

Description of the Related Art

Japanese Unexamined Patent Application Publication No. 2018-134703 discloses a robot simulator including a model storage unit that stores model information related to a robot and an obstacle, and an information processing unit that generates a path capable of moving a tip portion of the robot from a start position to an end position based on the model information while avoiding collision between the robot and the obstacle.

SUMMARY

Disclosed herein is a simulation device. The simulation device may include circuitry configured to: execute a first simulation of a first control of a first machine, wherein the first control is executed by a first controller; execute a second simulation of a second control of a second machine, wherein the second control is executed by a second controller so that the second machine operates in collaboration with the first machine; and control progress of the first simulation and progress of the second simulation to maintain a simulated ratio of a progress speed of the first simulation and a progress speed of the second simulation to be equal to a ratio of a progress speed of the first control and a progress speed of the second control.

Additionally, a simulation method is disclosed herein. The simulation method may include: executing a first simulation of a first control of a first machine, wherein the first control is executed by a first controller; executing a second simulation of a second control of a second machine, wherein the second control is executed by a second controller so that the second machine operates in collaboration with the first machine; and controlling progress of the first simulation and progress of the second simulation to maintain a simulated ratio of a progress speed of the first simulation and a progress speed of the second simulation to be equal to a ratio of a progress speed of the first control and a progress speed of the second control.

Additionally, a non-transitory memory device is disclosed herein. The non-transitory memory device has instructions stored thereon that, in response to execution by a processing device, cause the processing device to perform operations. The operations may include: executing a first simulation of a first control of a first machine, wherein the first control is executed by a first controller; executing a second simulation of a second control of a second machine, wherein the second control is executed by a second controller so that the second machine operates in collaboration with the first machine; and controlling progress of the first simulation and progress of the second simulation to maintain a simulated ratio of a progress speed of the first simulation and a progress speed of the second simulation to be equal to a ratio of a progress speed of the first control and a progress speed of the second control.

BRIEF DESCRIPTION OF THE DRAWINGS

FIG. 7 is a table illustrating an example communication definition.

DETAILED DESCRIPTION

In the following description, with reference to the drawings, the same reference numbers are assigned to the same components or to similar components having the same function, and overlapping description is omitted.

Machine System

Figure 1:
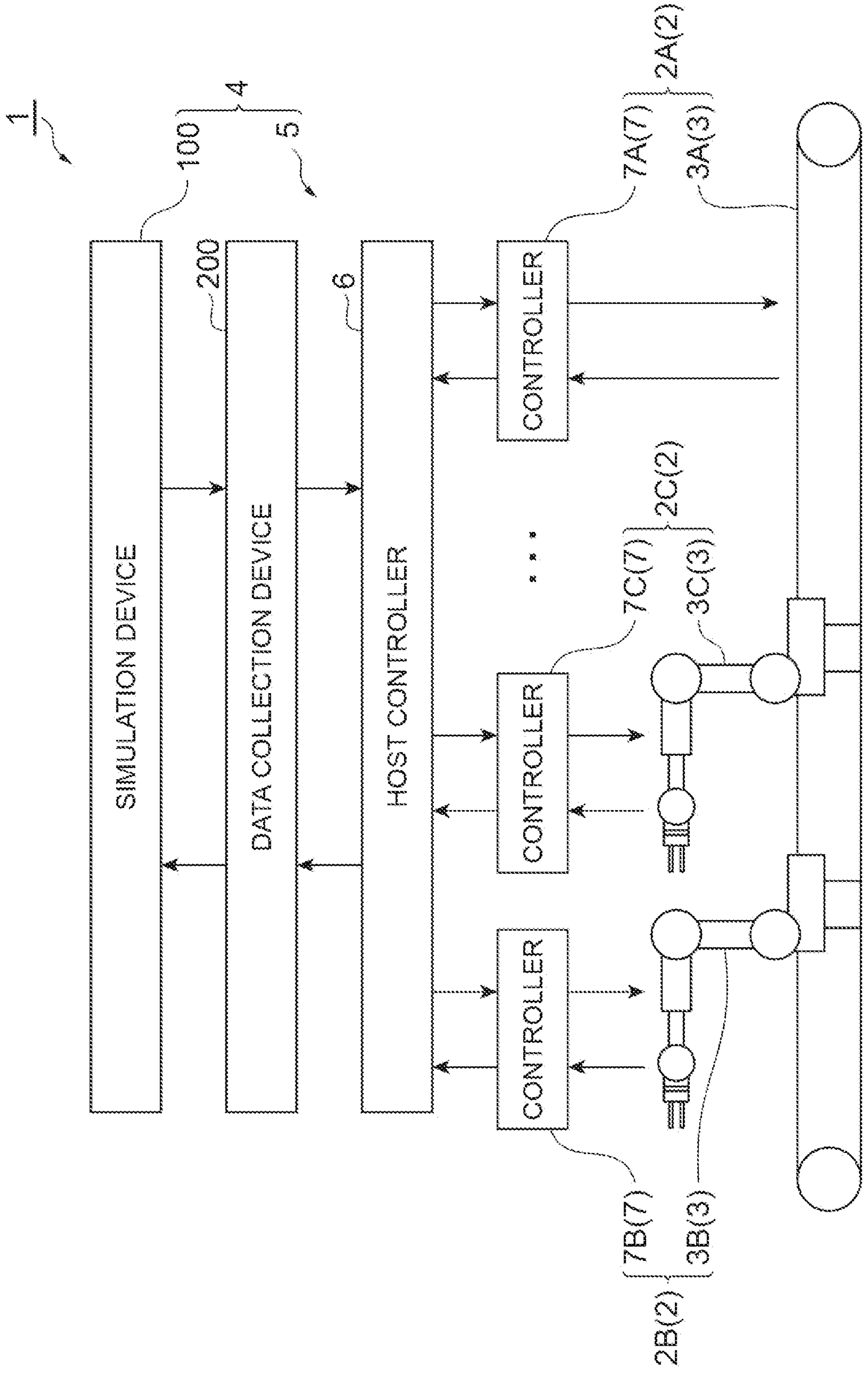
FIG. 1 is a schematic diagram illustrating an example configuration of a machine system.

A machine system 1 illustrated in FIG. 1 is a system in which a plurality of machines 3 are operated in cooperation. Examples of the machine system 1 include a production system in which a plurality of machines 3 are controlled to cooperatively operate so as to produce workpieces. However, the operation of the plurality of machines 3 may not be limited for production of workpieces.

Controlling the plurality of machines 3 to cooperatively operate means, for example, controlling the plurality of machines to share and execute a plurality of operations for achieving the same outcome, and may include controlling another machine to operate according to an operation result of any one machine. When the "same outcome" is production of workpieces, the machine system 1 may control the plurality of machines 3 to share and execute a plurality of operations for obtaining one workpiece, or may control the plurality of machines 3 to share and execute a plurality of operations for each of a plurality of workpieces.

The machine system 1 includes a plurality of machines 3, an actual control system 5 controlling the plurality of machines 3, a simulation device 100, and a data collection device 200. The number of machines 3 is not particularly limited. The plurality of machines 3 may include a robot. As examples of the plurality of machines 3, a conveyor 3A and robots 3B and 3C are illustrated in FIG. 1.

The conveyor 3A transports the workpiece by power of, for example, an electric motor. Examples of the conveyor 3A include a belt conveyor and a roller conveyor. The robots 3B and 3C execute operation on workpieces transported by the conveyor 3A. Examples of the operation on the workpiece include assembly of another workpiece (for example, a sub-part) on a workpiece (for example, a base part) transported by the conveyor 3A, fastening (for example, bolt fastening) and joining (for example, welding) of parts in a workpiece transported by the conveyor 3A, and the like.

The operations of the conveyor 3A and the robots 3B and 3C may include cooperative operations of the conveyor 3A and the robots 3B and 3C. executed For example, the robots 3B and 3C may execute operations on a workpiece at a timing when the workpiece is placed at a predetermined operation position by the conveyor 3A. The conveyor 3A may suspend the transport of the workpiece while the operation by the robots 3B and 3C is being executed, and may resume the transport of the workpiece after the operation by the robots 3B and 3C is completed.

The operations of the conveyor 3A and the robots 3B and 3C may include coordinated operations of the robots 3B and 3C. For example, the robot 3B may place a sub-part at a predetermined assembly position on a base part transported by the conveyor 3A, and the robot 3C may fasten or join the sub-part placed by the robot 3B to the base part. When the sub-part is fastened or joined to the base part at a plurality of locations, the fastening or joining at the plurality of locations may be shared by the robots 3B and 3C.

Figure 2:
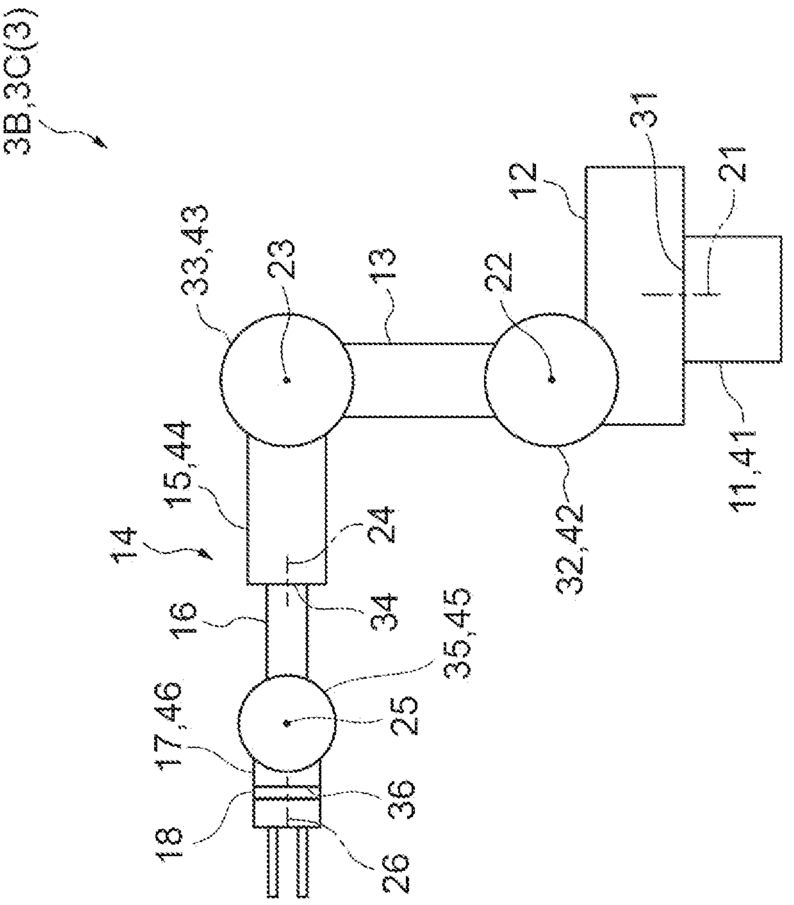
FIG. 2 is a schematic diagram illustrating an example configuration of a robot.

FIG. 2 is a diagram illustrating a schematic configuration of the robots 3B and 3C. For example, the robots 3B and 3C are six-axis vertical multi articulated robots and include a base 11, a turning portion 12, a first arm 13, a second arm 14, a third arm 17, a tip portion 18, and actuators 41, 42, 43, 44, 45, and 46. The base 11 is placed around the conveyor 3A. The turning portion 12 is mounted on the base 11 to turn about a vertical axis 21. The first arm 13 is connected to the turning portion 12 to swing about an axis 22 that intersects (e.g., is orthogonal to) the axis 21. The intersecting includes a case where there is a twisted relation such as so-called three-dimensional intersection. The second arm 14 is connected to the tip portion of the first arm 13 to swing about an axis 23 substantially parallel to the axis 22. The second arm 14 includes an arm base 15 and an arm end 16. The arm base 15 is connected to the tip portion of the first arm 13 and extends along an axis 24 that intersects (e.g., is orthogonal to) the axis 23. The arm end 16 is connected to the tip portion of the arm base 15 to turn about the axis 24. The third arm 17 is connected to the tip portion of the arm end 16 to swing about an axis 25 that intersects (e.g., is orthogonal to) the axis 24. The tip portion 18 is connected to the tip portion of the third arm 17 to turn about an axis 26 that intersects (e.g., is orthogonal to) the axis 25.

As described above, the robots 3B and 3C include a joint 31 connecting the base 11 and the turning portion 12, a joint 32 connecting the turning portion 12 and the first arm 13, a joint 33 connecting the first arm 13 and the second arm 14, a joint 34 connecting the arm base 15 and the arm end 16 in the second arm 14, a joint 35 connecting the arm end 16 and the third arm 17, and a joint 36 connecting the third arm 17 and the tip portion 18.

The actuators 41, 42, 43, 44, 45, and 46 include, for example, an electric motor and a speed reducer and drive joints 31, 32, 33, 34, 35, and 36, respectively. For example, the actuator 41 turns the turning portion 12 about the axis 21. The actuator 42 swings the first arm 13 about the axis 22. The actuator 43 swings the second arm 14 about the axis 23. The actuator 44 turns the arm end 16 about the axis 24. The actuator 45 swings the third arm 17 about the axis 25. The actuator 46 turns the tip portion 18 about the axis 26.

Configurations of the robots 3B and 3C can be modified. For example, the robots 3B and 3C may be a seven-axis redundant robot in which one axis joint is further added to the six-axis vertical multi articulated robot, or may be a so-called SCARA multi articulated robot.

A control system 4 controls the plurality of machines 3. The control system 4 is described in more detail below.

Control System

The control system 4 includes the actual control system 5 and the simulation device 100. The actual control system 5 controls the plurality of machines 3. The actual control system 5 may have a plurality of controllers 7 each controlling the plurality of machines 3 and a controller 6 capable of communicating with the plurality of controllers 7. As an example, FIG. 1 illustrates a controller 7A that controls the conveyor 3A, a controller 7B that controls the robot 3B, a controller 7C that controls the robot 3C, and the controller 6 that can communicate with the controllers 7A, 7B, and 7C.

The controller 7A is a motor controller, and repeatedly executes segment processing for operating the conveyor 3A in accordance with control commands at a predetermined control cycle. In the present disclosure, "segment processing" means processing assigned and determined per cycle, and the content thereof is not particularly limited as long as the processing is executed per cycle. Hereinafter, a control command for the controller 7A is referred to as a "transport control command", segment processing executed by the controller 7A is referred to as "transport segment processing", and a control cycle in which the transport segment processing is executed is referred to as a "transport control cycle".

The transport control command includes, for example, a transport target position and a moving speed of the workpiece to the transport target position. For example, the transport segment processing includes: calculating an operation target value of the conveyor 3A for each transport control cycle based on the transport control command; and operating the conveyor 3A in accordance with the operation target value.

The controller 7B is a robot controller, and repeatedly executes segment processing for operating the robot 3B in control commands at a predetermined control cycle. Hereinafter, the control command for the controller 7B is referred to as a "first robot control command". The segment processing executed by the controller 7B is referred to as a "first robot segment processing". The control cycle for executing the first robot segment processing is referred to as a "first robot control cycle".

The first robot control command includes, for example, an execution command of a job program. The job program is an operation program including one or more operation commands arranged in time series. The job program is prepared in advance and stored in the controller 7B. Each of the one or more operation commands includes a target position/posture of the tip portion 18 and a target movement speed of the tip portion 18 to the target position/posture.

The first robot segment processing includes: calculating a target position/posture of the tip portion 18 for each first robot control cycle based on the first robot control command; calculating an operation target value of the actuators 41, 42, 43, 44, 45, and 46 for moving the tip portion 18 to the calculated target position/posture by inverse kinematics calculation; and operating the actuators 41, 42, 43, 44, 45, and 46 in accordance with the calculated operation target value.

The controller 7C is a robot controller, and repeatedly executes segment processing for operating the robot 3C in a control command at a predetermined control cycle. Hereinafter, the control command for the controller 7C is referred to as a "second robot control command". The segment processing executed by the controller 7C is referred to as "second robot segment processing". The control cycle in which the second robot segment processing is executed is referred to as a "second robot control cycle".

The second robot control command includes, for example, an execution command of a job program. The job program is an operation program including one or more operation commands arranged in time series. The job program is prepared in advance and stored in the controller 7C. Each of the one or more operation commands includes a target position/posture of the tip portion 18 and a target movement speed of the tip portion 18 to the target position/posture.

The second robot segment processing includes: calculating a target position/posture of the tip portion 18 for each second robot control cycle based on the second robot control command; calculating an operation target value of the actuators 41, 42, 43, 44, 45, and 46 for moving the tip portion 18 to the calculated target position/posture by inverse kinematics calculation; and operating the actuators 41, 42, 43, 44, 45, and 46 in accordance with the calculated operation target value.

The controller 6 is, for example, a programmable logic controller, and repeatedly executes segment processing for coordinating operations of the plurality of machines 3 in a predetermined control cycle. Hereinafter, the segment processing executed by the controller 6 is referred to as "system segment processing", and the control cycle for executing the system segment processing is referred to as "system control cycle".

The system segment processing includes: receiving status information of a plurality of machines 3 and a workpiece from the plurality of the controller 7 or the like; designating a machine 3 to start a new operation (hereinafter referred to as a "control target machine") based on a predetermined system program and the status information; and transmitting a control command to initiate a new operation to the controller 7 of a control target machine 3. For example, when the conveyor 3A is the control target machine, the controller 6 transmits a transport control command for controlling the conveyor 3A to execute a new operation to the controller 7A based on the system program. When the robot 3B is the control target machine, the controller 6 transmits a first robot control command for controlling the robot 3B to execute a new operation to the controller 7B based on the system program. When the robot 3C is the control target machine, the controller 6 transmits a second robot control command for controlling the robot 3C to execute a new operation to the controller 7C based on the system program.

As an example, the controller 6 may be configured to: check whether the workpiece is placed at the operation position for the robots 3B and 3C based on the status information; transmit a transport control command for stopping transport of the workpiece by the conveyor 3A to the controller 7A when determining that the workpiece is placed at the operation position; and transmit a first robot control command and a second robot control command including an execution command of a job program of operation on the workpiece to the controllers 7B and 7C, respectively. Further, the controller 6 may be configured to: confirm whether the operations of the robots 3B and 3C on the workpiece is completed based on the status information; and transmit a transport control command for resuming the transport of the workpiece by the conveyor 3A to the controller 7A when determining that the operations of the robots 3B and 3C on the workpiece is completed.

As the controller 6 transmits the transmission control command and the first robot control command in this manner, the controllers 7B and 7C (second controller) operate the robots 3B and 3C in coordination with the operation of the conveyor 3A under the control of the controller 7A (first controller). The controller 7A (second controller) operates the conveyor 3A in coordination with the operations of the robots 3B and 3C under the control of the controllers 7B and 7C (first controller).

The controller 6 may check whether the first sub-part is placed at a predetermined first assembly position in the base part by the robot 3B based on the status information, and may transmit a second robot control command including an execution command of a job program of an operation of fastening or joining the first sub-part to the base part to the robot 3C when determining that the first sub-part is placed at the first assembly position.

The controller 6 may confirm whether the first sub-part is fastened or joined to the base part by the robot 3C based on the status information, and may transmit a first robot control command including an execution command of a job program for placing the second sub-part at a predetermined second assembly position in the base part to the robot 3B when determining that the first sub-part is fastened or joined to the base part.

The controller 6 may check whether the second sub-part is placed at the second assembly position by the robot 3B based on the status information, and transmit a second robot control command including an execution command of a job program of an operation of fastening or joining the second sub-part to the base part to the robot 3C when determining that the second sub-part is placed at the second assembly position.

As the controller 6 transmits the first robot control command and the second robot control command as described above, the controller 7C (second controller) controls the robot 3C to operate in coordination with the operation of the robot 3B under the control of the controller 7B (first controller). Also, the controller 7B (second controller) controls the robot 3B to operate in coordination with the operation of the robot 3C under the control of the controller 7C (first controller).

As described above, since the controller 6 can communicate with the plurality of controllers 7, the controllers 7 can indirectly communicate with each other via the controller 6. The controllers 7 may be able to directly communicate with each other.

Transmitting the control command to the controller 7 by the controller 6 corresponds to controlling the machine 2 including the controller 7 and the machine 3 by the controller 6. For example, transmitting the control command to the controller 7A by the controller 6 corresponds to controlling the machine 2A including the controller 7A and the conveyor 3A by the controller 6. Transmitting the control command to the controller 7B by the controller 6 corresponds to controlling the machine 2B including the controller 7B and the robot 3B by the controller 6. Transmitting the control command to the controller 7C by the controller 6 corresponds to controlling the machine 2C including the controller 7C and the robot 3C by the controller 6.

Therefore, the controller 6 corresponds to a controller that controls the machines 2A, 2B, and 2C. Operating, by the controllers 7B and 7C, the robots 3B and 3C in coordination with the operation of the conveyor 3A that is under the control of the controller 7A corresponds to operating, by the controllers 7B and 7C (second controller), the robots 3B and 3C in coordination with the operation of the machine 2A that is under the control of the controller 6 (first controller).

Operating, by the controller 7A, the conveyor 3A in coordination with the operation of the robots 3B and 3C that are under the control of the controllers 7B and 7C corresponds to operating, by the controller 7A (second controller), the conveyor 3A in coordination with the operation of the machines 2B and 2C that are under the control of the controller 6 (first controller).

Operating, by the controller 7B, the robot 3C in coordination with the operation of the robot 3B that is under the control of the controller 7B corresponds to operating, by the controller 7C (second controller), the robot 3C in coordination with the operation of the machine 2B that is under the control of the controller 6 (first controller).

Operating, by the controller 7B, the robot 3B in coordination with the operation of the robot 3C that is under the control of controller 7C corresponds to operating, by the controller 7B (second controller), the robot 3B in coordination with the operation of the machine 2C that is under the control of the controller 6 (first controller).

The simulation device 100 simulates the control over the machines 3 by the actual control system 5. However, simulation of each of the plurality of machines 3 may not be executed in real time. For example, simulation of transport segment processing by the controller 7A includes calculating an operation target value of the conveyor 3A for each transport-control cycle based on a transport-control command and calculating an operation amount of the conveyor 3A in accordance with the operation target value. However, an operation time of the simulation may not be coincide with the transport-control cycle. Therefore, when the control by the controller 6 and the plurality of the controller 7 is individually simulated, the relation between the progress of the control by the controller 6 and the progress of the control by the controller 7 and the relation between the progress of the control by the controller 7 and the progress of the control by the controller 7 cannot be simulated, and the cooperative relation of the plurality of machines 3 cannot be reproduced in the simulation space.

In contrast, the simulation device 100 is configured to execute: simulating, by a first simulator, the control of a first machine by a first controller; simulating, by a second simulator, the control of a second machine by a second controller; and controlling the progress of simulation by the first simulator and the progress of simulation by the second simulator based on the relation between the progress of control by the first controller and the progress of control by the second controller.

Thus, even in the non-real-time simulation executed at elapsed time different from real time, the relation between the progress of simulation by the first simulator and the progress of simulation by the second simulator can be readily made to correspond to the relation between the progress of control of the first machine by the first controller and the progress of control of the second machine by the second controller. Therefore, the cooperative relation of the plurality of machines 3 may readily be reproduced in the simulation space.

Figure 3:
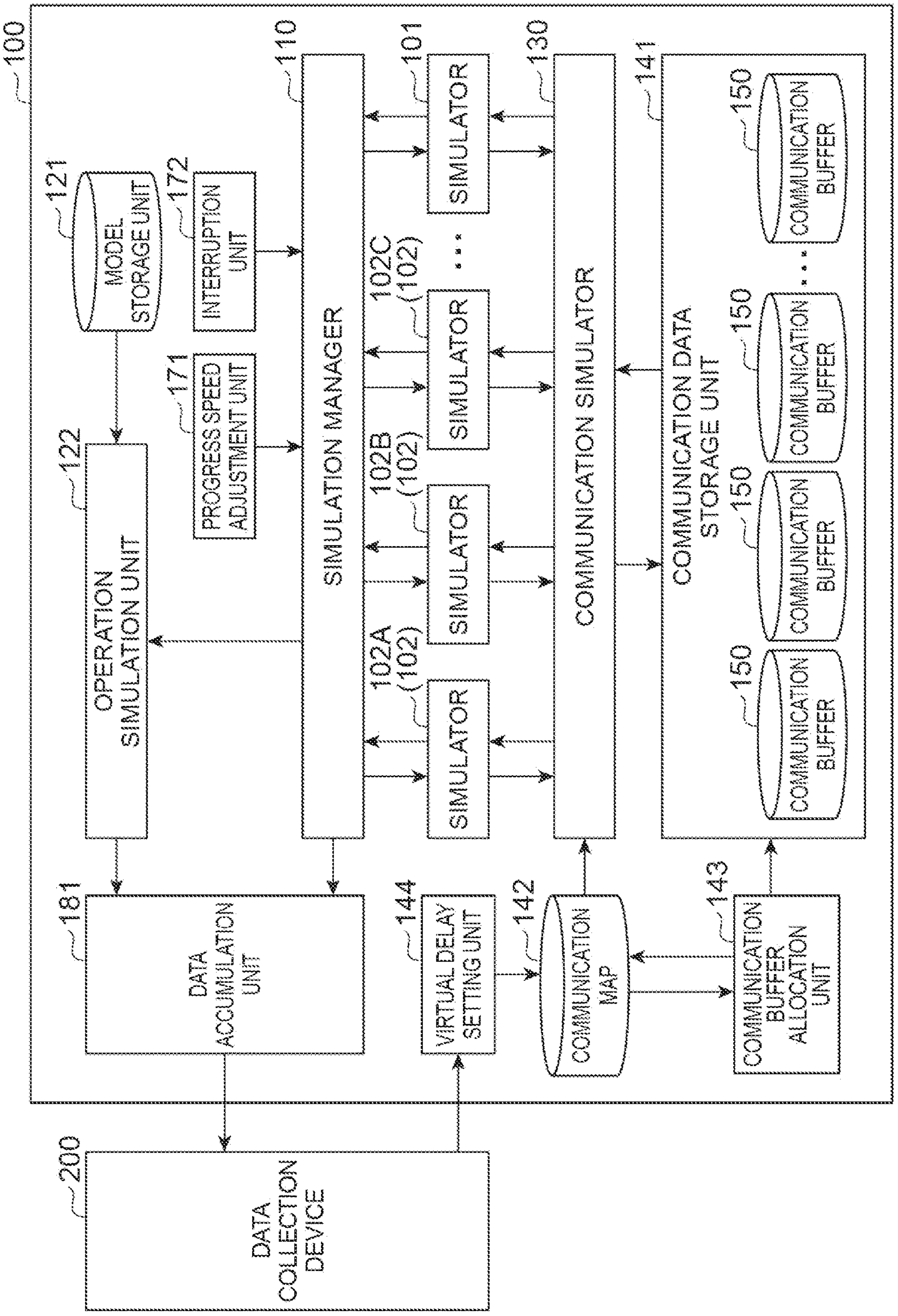
FIG. 3 is a block diagram illustrating an example configuration of a simulation device.

For example, as illustrated in FIG. 3, the simulation device 100 includes a plurality of simulators 101 and 102 and a simulation manager 110 as functional components.

As an example of the plurality of simulators 102, simulators 102A, 102B, 102C corresponding to the controller 7A, 7B, and 7C, respectively, are illustrated in FIG. 3. The simulator 102A simulates control over the conveyor 3A by the controller 7A. For example, the simulator 102A simulates the above-described transport segment processing by the controller 7A. The simulation of the transport segment processing includes calculating an operation target value of the conveyor 3A for each transport control cycle based on the transport control command and calculating an operation amount of the conveyor 3A corresponding to the operation target value.

The simulator 102B simulates control over the robot 3B by the controller 7B. For example, the simulator 102B simulates the first robot segment processing by the controller 7B described above. The simulation of the first robot segment processing includes: calculating a target position/posture of the tip portion 18 for each first robot control cycle based on the first robot control command; calculating operation target values of the actuators 41, 42, 43, 44, 45, and 46 for moving the tip portion 18 to the calculated target position/posture by inverse kinematics calculation; and calculating operation amounts of the actuators 41, 42, 43, 44, 45, and 46 corresponding to the calculated operation target values.

The simulator 102C simulates control over the robot 3C by the controller 7C. For example, the simulator 102C simulates the second robot segment processing by the controller 7C described above. The simulation of the second robot segment processing includes: calculating a target position posture of the tip portion 18 for each second robot control cycle based on the second robot control command; calculating operation target values of the actuators 41, 42, 43, 44, 45, and 46 for moving the tip portion 18 to the calculated target position/posture by inverse kinematics calculation calculating operation amounts of the actuators 41, 42, 43, 44, 45, and 46 corresponding to the calculated operation target values.

The simulator 101 simulates controls for the machines 2A, 2B, and 2C by the controller 6. For example, the simulator 101 simulates the above-described system segment processing by the controller 6. The simulation of the system segment processing includes: acquiring virtual status information of the machines 3 and a workpiece based on simulation results of the simulators 102A, 102B, and 102C; designating a machine 3 to start a new operation (hereinafter referred to as a “control target machine”) based on a predetermined system program and the virtual status information; and transmitting a control command for starting a new operation to the simulator 102 of the control target machine 3.

The simulators 102B and 102C (second simulator) may simulate control for the robots 3B and 3C (second machine) by the controller 7B and 7C (second controller) so as to coordinate a simulation result of operations of the robots 3B and 3C (second machine) with a simulation result of operation of the conveyor 3A (first machine) by the simulator 102A (first simulator).

The simulators 102B and 102C (second simulator) may simulate control for the robots 3B and 3C (second machine) by the controllers 7B and 7C (second controller) so as to coordinate a simulation result of operations of the robots 3B and 3C (second machine) with a simulation result of operation of the machine 2A (first machine) by the simulator 101 (first simulator).

The simulator 102A (second simulator) may simulate control on the conveyor 3A (second machine) by the controller 7A (second controller) so as to coordinate a simulation result of the operation of the conveyor 3A (second machine) with a simulation result of the operations of the robots 3B and 3C (first machine) by the simulators 102B and 102C (first simulator).

The simulator 102A (second simulator) may simulate the control of the conveyor 3A (second machine) by the controller 7A (second controller) so as to coordinate a simulation result of the operation of the conveyor 3A (second machine) with a simulation result of the operations of the machines 2B and 2C (first machine) by the simulator 101 (first simulator).

The simulator 102C (second simulator) may simulate the control of the robot 3C (second machine) by the controller 7C (second controller) so as to coordinate the simulation result of the operation of the robot 3C (second machine) with the simulation result of the operation of the robot 3B (first machine) by the simulator 102B (first simulator).

The simulator 102C (second simulator) may simulate the control of the robot 3C (second machine) by the controller 7C (second controller) so as to coordinate the simulation result of the operation of the robot 3C (second machine) with the simulation result of the operation of the machine 2B (first machine) by the simulator 101 (first simulator).

The simulator 102B (second simulator) may simulate the control of the robot 3B (second machine) by the controller 7B (second controller) so as to coordinate the simulation result of the operation of the robot 3B (second machine) with the simulation result of the operation of the robot 3C (first machine) by the simulator 102C (first simulator).

The simulator 102B (second simulator) may simulate the control of the robot 3B (second machine) by the controller 7B (second controller) so as to coordinate the simulation result of the operation of the robot 3B (second machine) with the simulation result of the operation of the machine 2C (first machine) by the simulator 101 (first simulator).

The simulation manager 110 controls the progress of simulation by the first simulator and the progress of simulation by the second simulator so as to correspond to the relation between the progress of control by the first controller and the progress of control by the second controller. For example, the simulation manager 110 may control the progress of the simulation by the simulator 101 and the progress of the simulation by the simulators 102A, 102B, and 102C so that the relation between the progress of simulation by the simulator 101 (first simulator) and the progress of simulation by the simulators 102A, 102B, and 102C (second simulator) corresponds to the relation between the progress of control by the controller 6 (first controller) and the progress of control by the controller 7A, 7B, and 7C (second controller). Accordingly, the among the progress of the simulation by the simulator 101, the progress of the simulation by the simulator 102A, the progress of the simulation by the simulator 102B, and the progress of the simulation by the simulator 102C corresponds to the relation between the progress of the control by the controller 6, the progress of the control by the controller 7A, the progress of the control by the controller 7B, and the progress of the control by the controller 7C.

The simulation manager 110 may control the execution timing of the first segment processing repeated by the first simulator and the execution timing of the second segment processing repeated by the second simulator so as to correspond to the relation between the execution timing of the first segment processing repeated under the control of the first controller and the execution timing of the second segment processing repeated under the control of the second controller.

For example, the simulation manager 110 may control the execution timing of system segment processing repeated by the simulator 101 and the execution timing of transport segment processing, first robot segment processing, and second robot segment processing repeated by the simulators 102A, 102B, and 102C, so as to cause relation between the execution timing of system segment processing repeated under control by the controller 6 (first controller) and the execution timing of transport segment processing, first robot segment processing, and second robot segment processing repeated under control by the controllers 7A, 7B, and 7C to correspond to relation between the execution timing of system segment processing repeated by the simulator 101 and the execution timing of transport segment processing, first robot segment processing, and second robot segment processing repeated by the simulators 102A, 102B, and 102C.

The simulation manager 110 may control execution timing of the first segment processing repeated by the first simulator and execution timing of the second segment processing repeated by the second simulator based on a first control period representing a repetition period of the first segment processing by the first controller and a second control period representing a repetition period of the second segment processing by the second controller. For example, the simulation manager 110 may control execution timing of system segment processing repeated by the simulator 101 and execution timing of transport segment processing, first robot segment processing, and second robot segment processing repeated by the simulators 102A, 102B, and 102C based on a system control cycle, a transport control cycle, a first robot control cycle, and a second robot control cycle.

Figure 4:
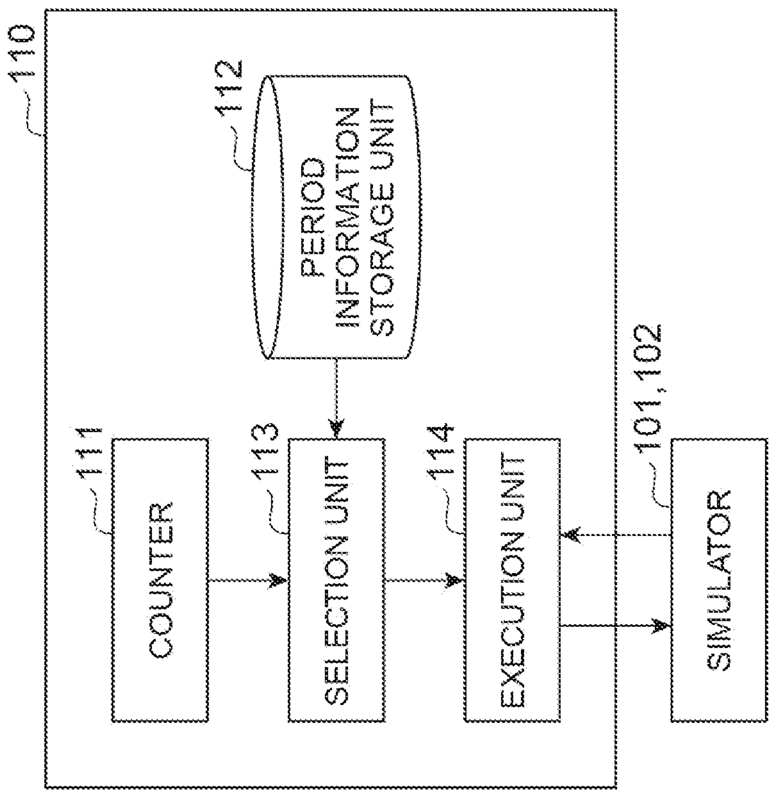
FIG. 4 is a block diagram illustrating an example configuration of a simulation manager.

As an example, the simulation manager 110 includes a counter 111, a period information storage unit 112, a selection unit 113, and an execution unit 114, as illustrated in FIG. 4. The counter 111 counts the number of the simulation cycles. The period information storage unit 112 stores the system control cycle, the transport control cycle, the first robot control cycle, and the second robot control cycle.

The selection unit 113 selects at least one of the simulator 101 and the simulators 102A, 102B, and 102C based on the system control cycle, the transport control cycle, the first robot control cycle, the second robot control cycle, and the number of simulation cycles. For example, the selection unit 113 selects the simulator 101 when the number of the simulation cycles counted after the previous execution of the system segment processing becomes the number of the simulation cycles corresponding to the system control cycle. Here, the number of the simulation cycles corresponding to a comparison target time such as the system control cycle means, for example, the number of simulation cycles in which a time obtained by multiplying the number of the simulation cycles by a predetermined simulation reference time is equal to or greater than the comparison target time.

The selection unit 113 selects the simulator 102A when the number of the simulation cycles counted after the previous execution of the transport segment processing becomes the number of simulation cycles corresponding to the transport control cycle. The selection unit 113 selects the simulator 102B when the number of the simulation cycles counted after the previous execution of the first robot segment processing becomes the number of simulation cycles corresponding to the first robot control cycle. The selection unit 113 selects the simulator 102C when the number of simulation cycles counted after the previous execution of the second robot segment processing becomes the number of the simulation cycles corresponding to the second robot control cycle.

The number of the simulation cycles corresponding to the system control cycle, the number of the simulation cycles corresponding to the transport control cycle, the number of the simulation cycles corresponding to the first robot control cycle, and the number of the simulation cycles corresponding to the second robot control cycle may be one or more. For example, the length of the simulation reference time described above may be equal to or less than the length of the shortest control cycle among the system control cycle, the transport control cycle, the first robot control cycle, and the second robot control cycle.

The execution unit 114 controls each of the at least one simulator selected by the selection unit 113 to execute the segment processing. For example, the execution unit 114 is configured to: control the simulator 101 to execute system segment processing when the simulator 101 is selected by the selection unit 113; control the simulator 102A to execute transport segment processing when the simulator 102A is selected by the selection unit 113; control the simulator 102B to execute first robot segment processing when the simulator 102B is selected by the selection unit 113; and control the simulator 102C to execute second robot segment processing when the simulator 102C is selected by the selection unit 113.

When receiving a designation of the individual simulation, the simulation manager 110 may select one individual simulator from the simulators 101 and 102 and execute the simulation by the individual simulator regardless of the progress of the simulation by the other simulator.

Returning to FIG. 3, the simulation device 100 may be configured to simulate the operation of the first machine and the operation of the second machine based on a simulation result by the first simulator and a simulation result by the second simulator.

For example, the simulation device 100 further includes a model storage unit 121 and an operation simulation unit 122. The model storage unit 121 stores model information of a plurality of machines 3. The model information of the machine 3 includes information on the structure of the machine 3 and the dimensions of each component.

The operation simulation unit 122 simulates the operations of the plurality of machines 3 based on the simulation result by the simulators 101 and 102. For example, the operation simulation unit 122 simulates the operation of the conveyor 3A based on the operation amount of the conveyor 3A calculated by the simulator 102A and the model information of the conveyor 3A stored in the model storage unit 121. The operation simulation unit 122 simulates the operation of the robot 3B by forward kinematics calculation based on the operation amount of the actuators 41, 42, 43, 44, 45, and 46 calculated by the simulator 102B and model information of the robot 3B stored in the model storage unit 121. Similarly, the operation simulation unit 122 simulates the operation of the robot 3C by forward kinematics calculation based on the operation amount of the actuators 41, 42, 43, 44, 45, and 46 calculated by the simulator 102C and model information of the robot 3C stored in the model storage unit 121.

The operation simulation unit 122 may simulate the operation of the first machine and the operation of the second machine after both the simulation result by the first simulator and the simulation result by the second simulator are updated. For example, after simulating the operations of the plurality of machines 3, the operation simulation unit 122 may simulate the operations of the plurality of machines 3 again at a timing at which all of the simulators 101 and 102 execute segment processing of one cycle or more. The operation simulation unit 122 may generate a simulation image of the operations of the plurality of machines 3 based on the simulation results of the operations of the plurality of machines 3, and display the simulation image on a display device 196 or the like described below.

The simulation device 100 may be configured to transfer communication data between the first simulator and the second simulator so as to reproduce communication executed directly or indirectly between the first controller and the second controller. For example, the simulation device 100 further includes a communication simulator 130 and a communication data storage unit 141.

The communication data storage unit 141 includes at least one communication buffer 150. The communication buffer 150 is used to temporarily store communication data for transfer between the first simulator and the second simulator. The communication buffer 150 may include a plurality of storage areas arranged from upstream to downstream in a data transfer direction. The communication data temporarily stored in the communication buffer 150 is sequentially transferred from the upstream to the downstream in the data transfer direction.

The communication simulator 130 transfers communication data between the first simulator and the second simulator so as to reproduce communication directly or indirectly executed between the first controller and the second controller. For example, the communication simulator 130 transfers communication data between a transmission side simulator and a reception side simulator in the simulators 101, 102A, 102B, and 102C so as to reproduce communication directly or indirectly executed between a transmission side controller and a reception side controller in the controllers 6, 7A, 7B, and 7C. The communication simulator 130 may control the reception side simulator to acquire the communication data generated by the transmission side simulator at a timing based on a predetermined virtual delay time.

Figure 5:
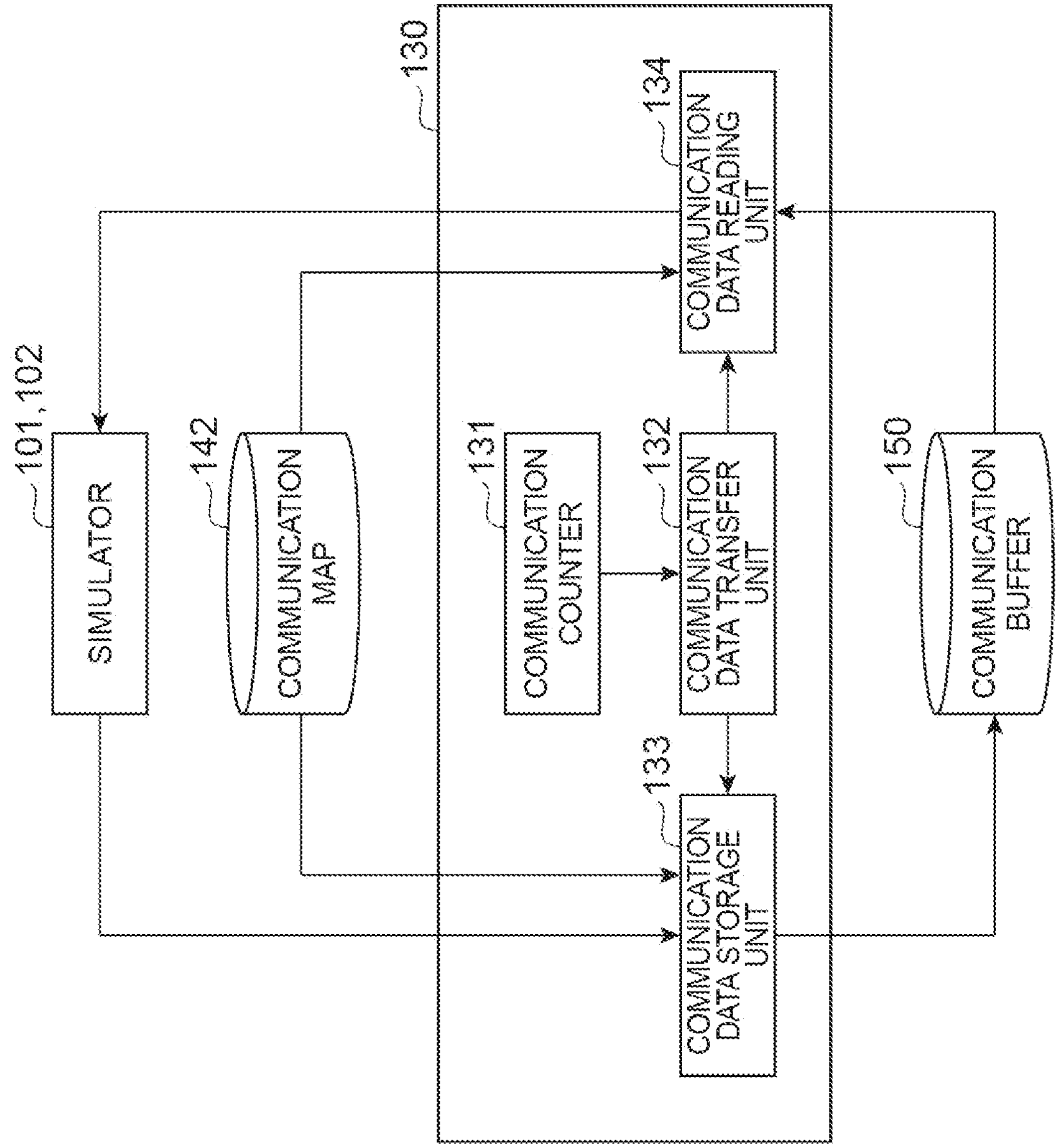
FIG. 5 is a block diagram illustrating an example configuration of a communication simulator.

For example, the communication simulator 130 includes a communication counter 131, a communication data storage unit 133, a communication data transfer unit 132, and a communication data reading unit 134, as illustrated in FIG. 5.

The communication counter 131 counts the number of communication cycles. The communication data storage unit 133 stores the communication data generated by the transmission side simulator into the communication buffer 150. For example, the communication data storage unit 133 stores the communication data generated by the transmission side simulator into the storage area on the most upstream side of the communication buffer 150. Each time the number of communication cycles is counted, the communication data transfer unit 132 transfers communication data to a storage area adjacent downstream in the communication buffer 150. The communication data reading unit 134 reads the communication data transferred to the most downstream storage area by the communication data transfer unit 132 and controls the reception side simulator to acquire the communication data.

When the number of communication cycles counted after the communication data is stored in the communication buffer 150 reaches the number of communication cycles corresponding to the virtual delay time, the communication data reading unit 134 reads the communication data stored in the communication buffer 150 and controls the reception side simulator to acquire the communication data. The number of communication cycles corresponding to the virtual delay time means, for example, the number of communication cycles in which a time obtained by multiplying the number of communication cycle by a predetermined communication reference time is equal to or greater than the virtual delay time.

For example, the communication buffer 150 may include storage areas the number of which corresponds to the virtual delay time. The number of storage areas corresponding to the virtual delay time means, for example, that a time obtained by multiplying the number of communication cycles until communication data stored in the most upstream storage area is transferred to the most downstream storage area by the communication reference time corresponds to the virtual delay time. For example, satisfying the following expression is an example in which the number of storage areas corresponds to the virtual delay time.

$$\text{number of storage areas}=\text{virtual delay time}/\text{communication reference time}+1 \quad (1)$$

If the number of storage areas in the communication buffer 150 corresponds to the virtual delay time, the number of communication cycles until the communication buffer 150 reads the communication data stored in the communication buffer 150 corresponds to the virtual delay time.

The communication counter 131 may count the number of communication cycles in synchronization with the counting of the simulation cycle by the counter 111. The communication counter 131 may count the number of communication cycles at a higher frequency than counting the simulation cycles by the counter 111. For example, the communication counter 131 may count the number of communication cycles at a frequency that is an integer multiple of the count of simulation cycles by the counter 111.

For example, the communication reference time may be the same as or shorter than the simulation reference time. The communication reference time may be an integer fraction of the simulation reference time.

Figure 6:
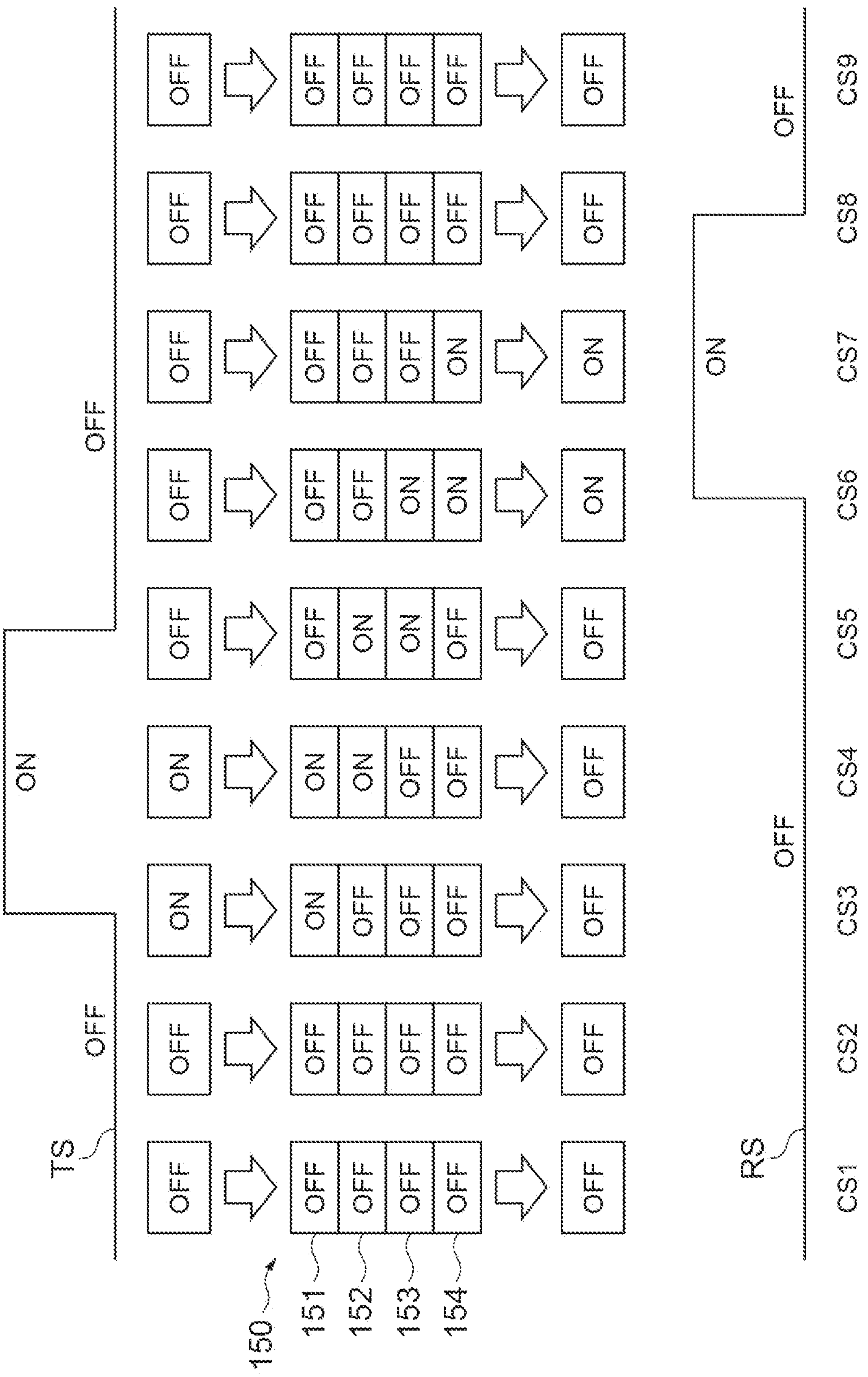
FIG. 6 is a schematic diagram illustrating example transitions of communication data generated by a transmission side simulator, contents of a communication buffer, and communication data acquired by a reception side simulator.

FIG. 6 is a diagram schematically illustrating transitions of communication data generated by the transmission side simulator, contents of the communication buffer 150, and communication data acquired by the reception side simulator. In FIG. 6, the communication buffer 150 includes four storage areas 151, 152, 153, and 154 arranged from upstream to downstream in the data transfer direction, but the number of communication data included in the communication buffer 150 is not limited to four.

A signal waveform TS is a graph illustrating one signal included in communication data generated by the transmission side simulator (hereinafter referred to as "communication signal"). A signal waveform RS is a graph illustrating the communication signal acquired by the reception side simulator. In each graph, the horizontal axis represents the number of communication cycles, and the vertical axis represents the value of the communication signal.

The signal waveforms TS and RS illustrates an example communication signal representing information by two values "OFF" or "ON". A low value of the signal waveforms TS and RS indicates that the communication signal is "OFF", and a high value of the signal waveforms TS and RS indicates that the communication signal is "ON".

In a communication cycle CS1, the communication data transfer unit 132 transfers each piece of communication data already stored in the communication buffer 150 to the adjacent downstream storage area. For example, the communication data transfer unit 132 transfers communication data stored in the storage area 153 to the storage area 154, transfers communication data stored in the storage area 152 to the storage area 153, and transfers communication data stored in the storage area 151 to the storage area 152. The communication data stored in the most downstream the storage area 154 is overwritten by the communication data transferred from the storage area 153.

Next, the communication data storage unit 133 stores the current value of the signal waveform TS, "OFF", in the most upstream the storage area 151. As a result, in the communication cycle CS1, "OFF" is stored in all of the storage areas 151, 152, 153, and 154. The communication data reading unit 134 reads out "OFF" stored in the storage area 154 on the most downstream side and controls the simulator for reception to acquire it. As a result, the current value of the signal waveform RS becomes "OFF".

The communication data transfer unit 132, the communication data storage unit 133, and the communication data reading unit 134 repeat the same process each time the number of communication cycles is counted by the communication counter 131. In a communication cycle CS3 in which the number of communication cycles is counted up by two by the communication counter 131 after the communication cycle CS1, since the current value of the signal waveform TS is "ON", "ON" is stored in the most upstream the storage area 151, and "OFF" is stored in the other storage areas 152, 153, and 154. Since the communication data reading unit 134 reads "OFF" stored in the storage area 154 on the most downstream side and controls the simulator for reception to acquire it, the current value of the signal waveform RS is maintained as "OFF".

In a communication cycle CS5 in which the number of communication cycles is counted up by two by the communication counter 131 after the communication cycle CS3, since the current value of the signal waveform TS is "OFF", "OFF" is stored in the storage area 151, "ON" is stored in the storage areas 152 and 153, and "OFF" is stored in the storage area 154. Since the communication data reading unit 134 reads "OFF" stored in the most downstream the storage area 154 and controls the simulator for reception to acquire it, the current value of the signal waveform RS is still maintained as "OFF".

In a communication cycle CS6 that is the next cycle of the communication cycle CS5, the "ON" stored in the storage area 151 at the communication cycle CS3 reaches the storage area 154. Since the communication data reading unit 134 reads this and controls the simulator for reception to acquire it, the current value of the signal waveform RS changes to "ON".

After the communication cycle CS6, in a communication cycle CS8 in which the number of communication cycles is counted up by two by the communication counter 131, "OFF" stored in the storage area 151 in the communication cycle CS5 reaches the storage area 154. Since the communication data reading unit 134 reads this and controls the simulator for reception to acquire it, the current value of the signal waveform RS changes to "OFF".

As described above, the change of the signal waveform RS is delayed by the number of communication cycles until the communication data stored in the most upstream storage area 151 reaches the most downstream storage area 154. That is, the change in the signal waveform RS is delayed by the number of communication cycles obtained by subtracting one from the number of storage areas of the communication buffer 150. The number of communication cycles of the delay simulates a communication delay time obtained by multiplying the number of communication cycles by the communication reference time.

Returning to FIG. 3, the communication simulator 130 may execute, for each of a plurality of communication definitions that respectively associate the plurality of transmission side simulators with the plurality of reception side simulators, acquiring the communication data from the transmission side simulator and causing the reception side simulator to acquire the communication data, based on the plurality of communication definitions.

For example, the simulation device 100 further includes a communication map 142. The communication map 142 stores the plurality of communication definitions. Each of the plurality of communication definitions may include a virtual delay time. The communication simulator 130 may control the reception side simulator to acquire communication data generated by the transmission side simulator at a timing based on the virtual delay time for each of the plurality of communication definitions.

The simulation device 100 may further include a communication buffer allocation unit 143. The communication buffer allocation unit 143 allocates a communication buffer having a size corresponding to the virtual delay time to each of the plurality of communication definitions. For example, the communication buffer allocation unit 143 allocates a communication buffer including the number of storage areas corresponding to the virtual delay time to each of the plurality of communication definitions. As an example, the communication buffer allocation unit 143 allocates a communication buffer including a number of storage areas satisfying the above expression (1) to each of a plurality of communication definitions.

The communication simulator 130 may store the communication data generated by the transmission side simulator in the communication buffer 150 for each of the plurality of communication definitions. When the number of communication cycles counted after the communication data is stored in the communication buffer 150 becomes the number of communication cycle corresponding to the virtual delay time, the communication simulator 130 may read the communication data stored in the communication buffer 150 and control the reception side simulator to acquire the communication data for each of the plurality of communication definitions.

For example, as illustrated in FIG. 5, the communication data storage unit 133 may refer to the communication map 142 and store the communication data generated by the transmission side simulator in the most upstream storage area of the communication buffer 150 for each of the plurality of communication definitions. Each time the number of communication cycles is counted, the communication data transfer unit 132 may transfer the communication data to the adjacent downstream storage area in the communication buffer 150 every time the number of communication cycles is counted for each of the plurality of communication definitions. The communication data reading unit 134 may refer to the communication map 142, read the communication data transferred to the most downstream storage area by the communication data transfer unit 132, and control the reception side simulator to acquire the communication data for each of the plurality of communication definitions.

FIG. 7 is a table illustrating a plurality of communication definitions stored in the communication map 142. In FIG. 7, one row of the table represents one a communication definition 160. The communication definition 160 includes a transmission side definition 161, a reception side definition 162, and a virtual delay time 163.

The transmission side definition 161 includes identification information of the transmission side simulator and an address. The address is an address of a storage area in which communication data generated by the transmission side simulator is written (hereinafter referred to as "transmission storage area"). The reception side definition 162 includes identification information and an address of the simulator on the receiving side. The address is an address of a storage area from which the simulator on the receiving side reads communication data during simulation (hereinafter referred to as "reception storage area").

Based on the communication definition 160, the communication data storage unit 133 reads the communication data stored in the transmission storage area, and stores the communication data in the most upstream storage area of the communication buffer 150. The communication data reading unit 134 reads the communication data stored in the most downstream storage area of the communication buffer 150 and stores the communication data in the reception storage area based on the communication definition 160.

The simulation device 100 may be configured to change the progress speed of the simulation by the simulators 101 and 102 in response to a designated playback speed. The simulation device 100 may also be configured to suspend the simulation by the simulators 101 and 102 in response to a stop command. For example, the simulation device 100 further includes a progress speed adjustment unit 171 and a suspension unit 172.

The progress speed adjustment unit 171 acquires the designation of playback speed from, for example, an input device 195 described later, and changes the progress speed of simulation by the simulators 101 and 102 in accordance with the designation of playback speed. For example, the progress speed adjustment unit 171 executes counting of the number of simulation cycles by the counter 111 in a predetermined simulation cycle, and changes the simulation cycle in accordance with designation of playback speed. For example, the progress speed adjustment unit 171 increases the playback speed by shortening the simulation cycle, and decreases the playback speed by lengthening the simulation cycle.

The suspension unit 172 acquires a stop command from the input device 195 described later, for example, and suspends simulation by the simulators 101 and 102 in response to the stop command. For example, the suspension unit 172 suspends the counting of the number of simulation cycles number by the counter 111.

The control system 4 may be configured to set the above-described virtual delay time by comparing a simulation result by the simulation device 100 and an actual control result by the actual control system 5. In addition, the control system 4 may be configured to detect an anomaly in the actual control system 5 by comparing the simulation result by the simulation device 100 and the actual control result by the actual control system 5.

For example, the control system 4 may further include the data collection device 200. The data collection device 200 collects virtual results representing simulation results from the simulation device 100 and real results representing control results from the actual control system 5.

Figure 8:
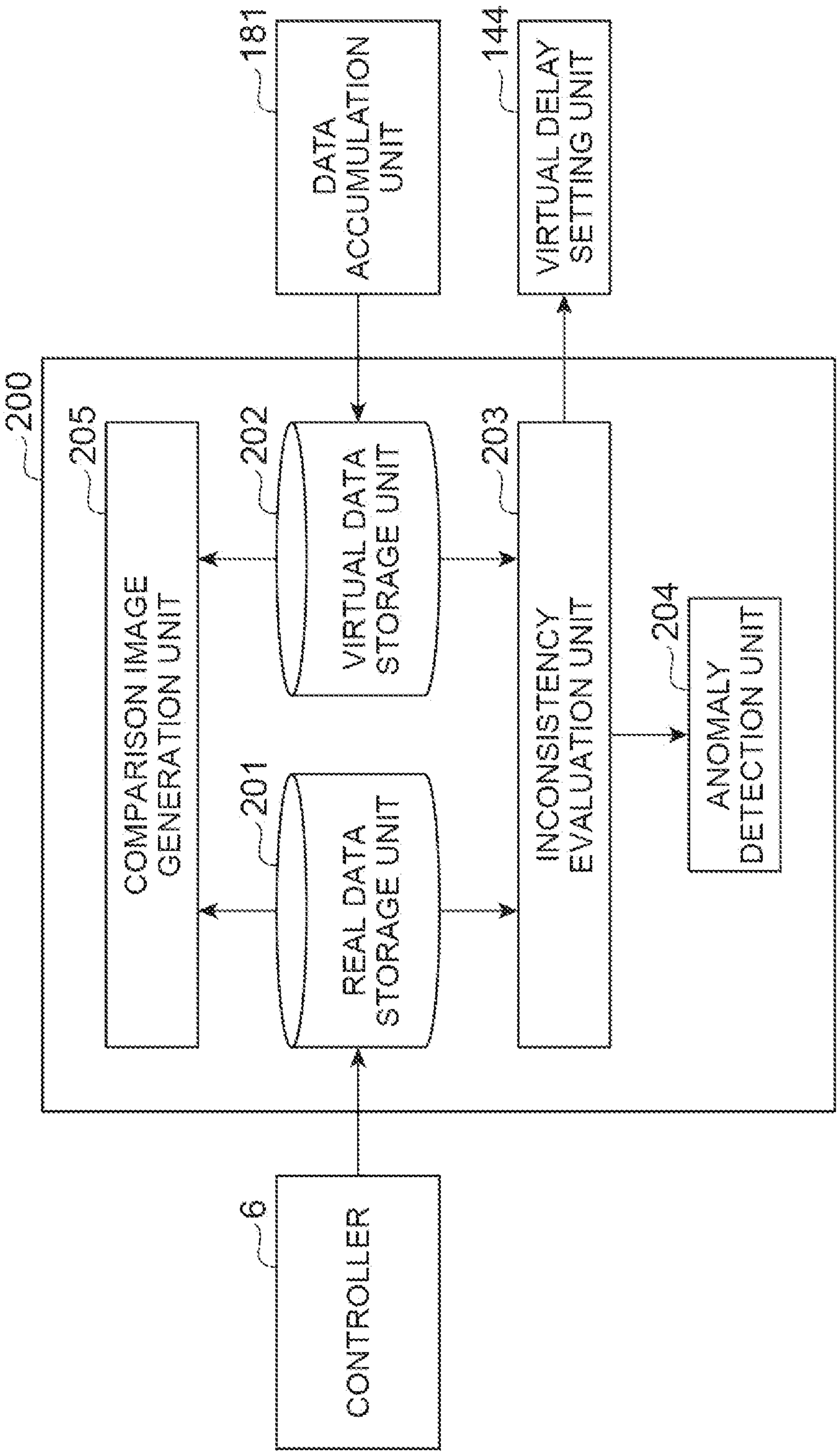
FIG. 8 is a block diagram illustrating an example configuration of a data collection device.

As illustrated in FIG. 8, the data collection device 200 includes a real data storage unit 201, a virtual data storage unit 202, and an inconsistency evaluation unit 203. The real data storage unit 201 acquires and accumulates real information from the controller 6. The virtual data storage unit 202 acquires and accumulates virtual information from the simulation device 100.

The inconsistency evaluation unit 203 evaluates the inconsistency between the virtual data and the real data. For example, the inconsistency evaluation unit 203 converts the number of simulation cycles into elapsed time by multiplying the number of simulation cycles by the simulation reference time, and then evaluates the inconsistency between the occurrence times of various events in the virtual data and the occurrence times of various events in the real data.

If the control system 4 further includes the data collection device 200, the simulation device 100 may further include a data accumulation unit 181 and a virtual delay setting unit 144. The data accumulation unit 181 acquires a simulation result by the simulators 101, 102A, 102B, and 102C from the simulation manager 110, acquires simulation results of operations of a plurality of machines 3 from the operation simulation unit 122, and accumulates them in the virtual data storage unit 202.

The virtual delay setting unit 144 associates the virtual delay time with the communication delay time in actual control. The virtual delay setting unit 144 may associate the virtual delay time with the communication delay time in the actual control for each of the plurality of communication definitions. For example, the virtual delay setting unit 144 repeats acquisition of the evaluation result of the inconsistency evaluated by the inconsistency evaluation unit 203 and change of the virtual delay time for each of the plurality of communication definitions so as to reduce the evaluation result of the inconsistency until the evaluation result of the inconsistency becomes equal to or lower than a predetermined calibration level.

The data collection device 200 may further include an anomaly detection unit 204. The anomaly detection unit 204 detects an anomaly of the actual control system 5 based on comparison between progress of control by the controllers 6, 7A, 7B, and 7C and progress of simulation by the simulators 101, 102A, 102B, and 102C.

For example, the anomaly detection unit 204 detects the anomaly of the actual control system 5 based on the evaluation result of the inconsistency evaluated by the inconsistency evaluation unit 203. For example, the anomaly detection unit 204 detects the anomaly of the actual control system 5 when the evaluation result of the inconsistency evaluated by the inconsistency evaluation unit 203 exceeds a predetermined anomaly detection level.

The data collection device 200 may further include a comparison image generation unit 205. The comparison image generation unit 205 generates a comparison image that compares the progress of control by the controllers 6 and 7 with the progress of simulation by the simulators 101 and 102, and displays the comparison image in the display devices 196 and 296 or the like described later. For example, the comparison image generation unit 205 generates a comparison image including a timing chart indicating the occurrence times of various events in the virtual data and the occurrence times of various events in the real data.

Figure 9:
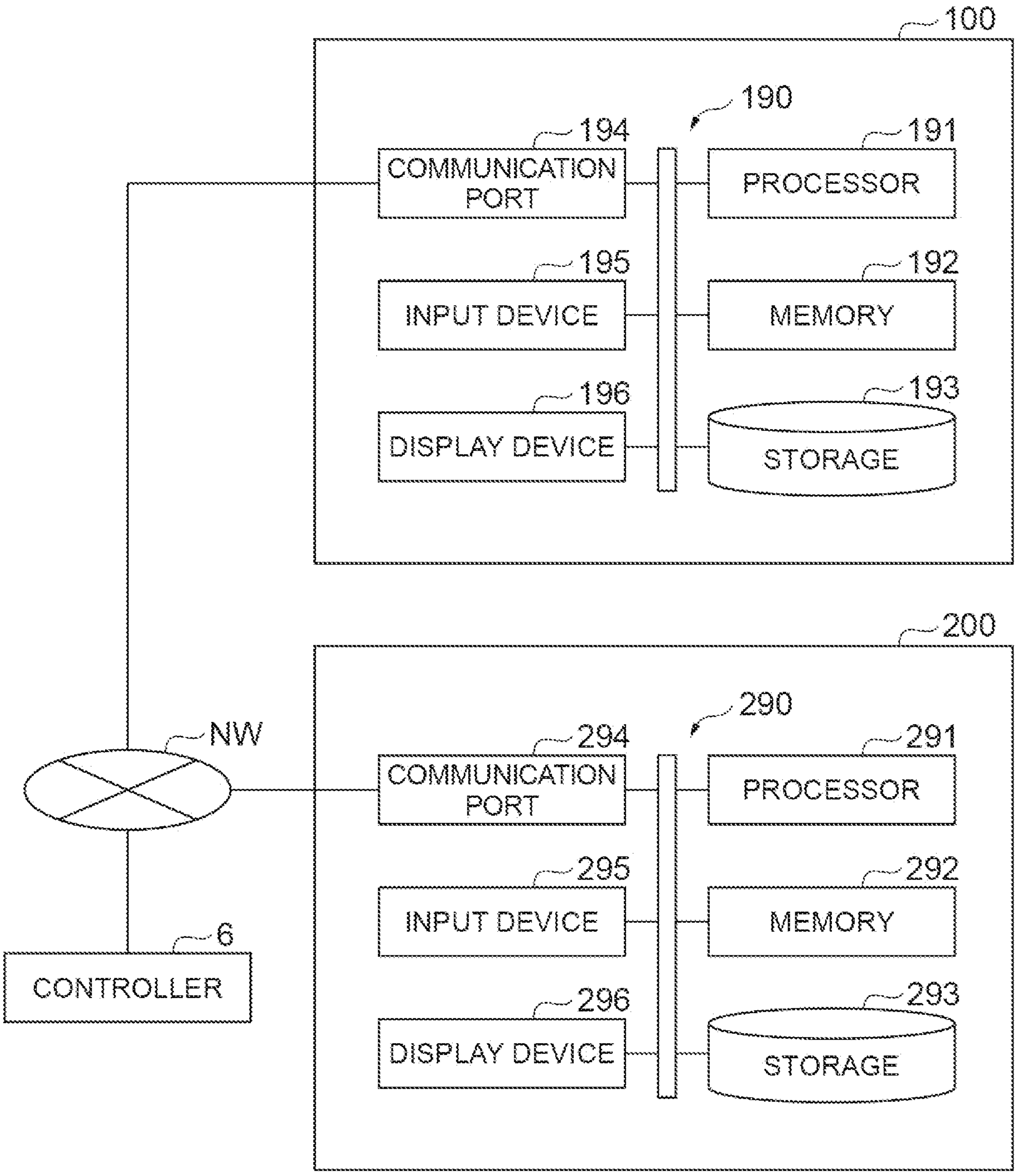
FIG. 9 is a block diagram illustrating an example hardware configuration of the simulation device and the data collection device.

FIG. 9 is a block diagram illustrating hardware configurations of the simulation device 100 and the data collection device 200. As illustrated in FIG. 9, the simulation device 100 includes circuitry 190. The circuitry 190 includes one or more processor(s) 191, a memory 192, storage 193, a communication port 194, the input device 195, and the display device 196. The storage 193 includes a computer-readable storage medium, such as a nonvolatile semiconductor memory. The storage 193 stores a program that causes the simulation device 100 to configure: a first simulator configured to simulate control of a first machine by a first controller; a second simulator configured to simulate control of a second machine by a second controller; and the simulation manager 110 configured to control the progress of simulation by the first simulator and the progress of simulation by the second simulator so as to correspond to the relation between the progress of control by the first controller and the progress of control by the second controller.

The memory 192 temporarily stores the program loaded from the storage medium of the storage 193 and the calculation result by the processor 191. The processor 191 configures each functional block of the simulation device 100 by executing the program in cooperation with the memory 192. The communication port 194 communicates with the data collection device 200 and the controller 6 via a network NW in accordance with requests from the processor 191. The input device 195 and the display device 196 serve as a user interface for the simulation device 100. The input device 195 is, for example, a keypad or the like, and acquires input information by the user. The display device 196 includes, for example, a liquid crystal monitor, and is used for displaying information to the user. The input device 195 and the display device 196 may be integrated like a so-called touch panel. The input device 195 and the display device 196 may be incorporated in the simulation device 100 or may be provided in an external device connected to the simulation device 100.

The data collection device 200 includes circuitry 290. The circuitry 290 includes one or more processor(s) 291, a memory 292, storage 293, a communication port 294, an input device 295, and a display device 296. The storage 293 includes a computer-readable storage medium, such as a nonvolatile semiconductor memory. The storage 293 stores a program that causes the data collection device 200 to configure: the real data storage unit 201 configured to acquire and store real data from the controller 6; the virtual data storage unit 202 configured to acquire and store virtual data from the simulation device 100; and the inconsistency evaluation unit 203 configured to evaluate the inconsistency between the virtual data and the real data.

The memory 292 temporarily stores the program loaded from the storage medium of the storage 293 and the calculation result by the processor 291. The processor 291 configures each functional block of the data collection device 200 by executing the program in cooperation with the memory 292. The communication port 294 communicates with the simulation device 100 and the controller 6 via the network NW in accordance with requests from the processor 291. The input device 295 and the display device 296 serve as a user interface for the data collection device 200. The input device 295 is, for example, a keypad or the like, and acquires input information by the user. The display device 296 includes, for example, a liquid crystal monitor, and is used for displaying information to the user. The input device 295 and the display device 296 may be integrated like a so-called touch panel. The input device 295 and the display device 296 may be incorporated in the data collection device 200 or may be provided in an external device connected to the data collection device 200.

It should be noted that the circuitry 190 and the circuitry 290 may not be limited to those whose functions are configured by programs. For example, at least a part of functions of the circuitry 190 and the circuitry 290 may be configured by a dedicated logic circuit or an application specific integrated circuit (ASIC) in which the dedicated logic circuit is integrated. In hardware, the simulation device 100 and the data collection device 200 may not be separated from each other, and the simulation device 100 and the data collection device 200 may be configured by a single computer.

Simulation Procedure

Next, as an example of the simulation method, an example simulation procedure executed by the simulation device 100 will be described. This procedure includes: simulating, by a first simulator, the control of a first machine by a first controller; simulating, by a second simulator, the control of a second machine by a second controller; and controlling the progress of simulation by a first simulator and the progress of simulation by a second simulator based on the relation between the progress of control by the first controller and the progress of control by the second controller.

Figure 10:
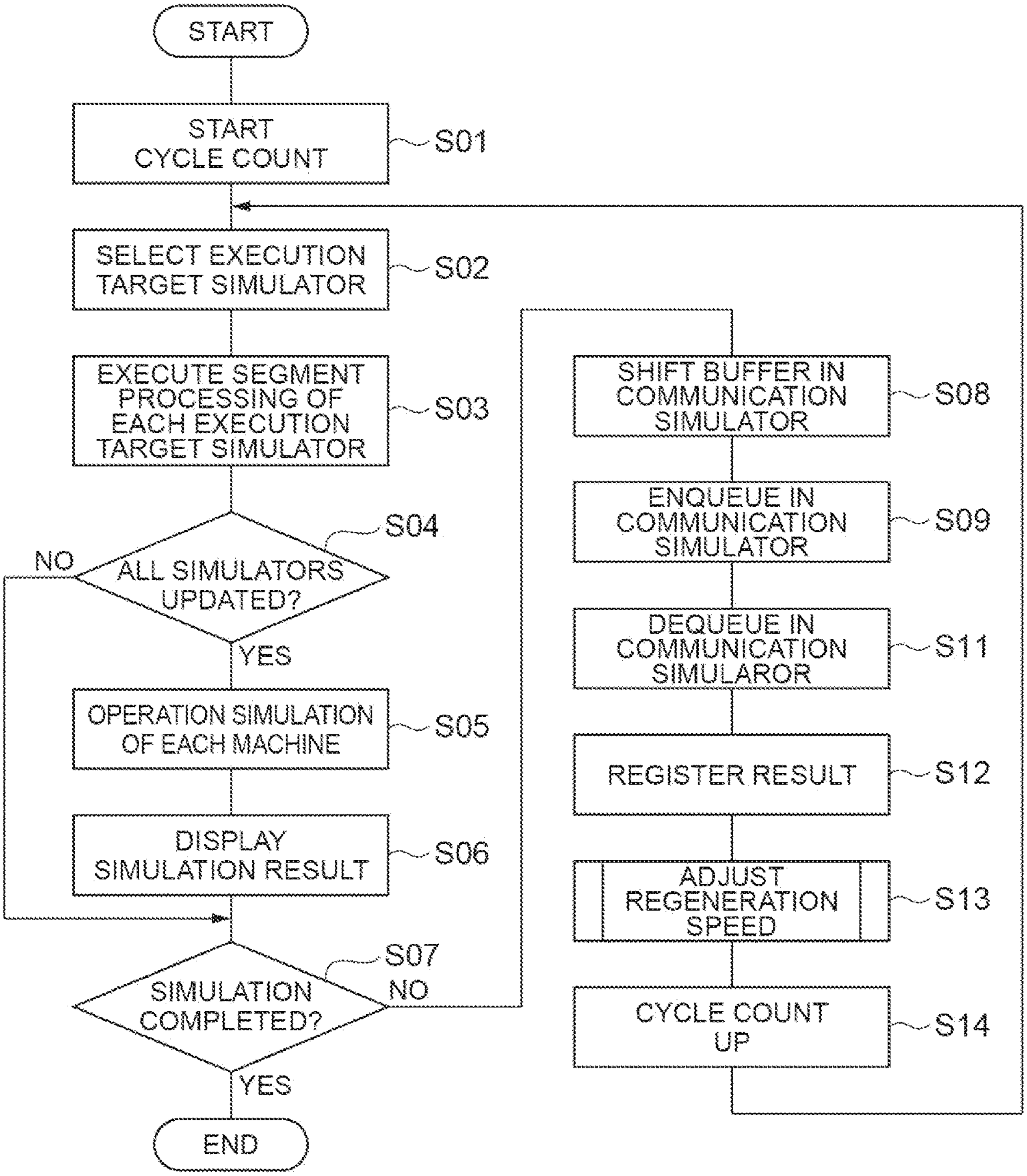
FIG. 10 is a flowchart illustrating an example simulation procedure.

As illustrated in FIG. 10, the simulation device 100 first executes operations S01, S02, S03, and S04. In operation S01, the counter 111 starts counting the number of simulation cycles. In operation S02, the selection unit 113 selects at least one of the simulator 101, the simulator 102A, 102B, and 102C based on the system control cycle, the transport control cycle, the first robot control cycle, the second robot control cycle, and the number of simulation cycles.

In operation S03, the execution unit 114 controls each of the at least one simulator selected by the selection unit 113 to execute segment processing. In operation S04, the operation simulation unit 122 checks whether all of the simulators 101 and 102 have executed segment processing of one cycle or more.

In operation S04, if it is determined that all of the simulators 101 and 102 have executed segment processing of one cycle or more, the simulation device 100 executes operations S05 and S06. In operation S05, the operation simulation unit 122 simulates the operations of the plurality of machines 3 based on the simulation result by the simulators 101 and 102. In operation S06, the operation simulation unit 122 generates a simulation image of the operations of the plurality of machines 3 based on the simulation results of the operations of the plurality of machines 3, and displays the simulation image on the display device 196 or the like.

Next, the simulation device 100 executes operation S07. If it is determined in operation S04 that simulators 101 and 102 remain for which segment processing of one cycle or more have not been executed, the simulation device 100 executes operation S07 without executing operations S05 and S06. In operation S07, the simulation manager 110 checks whether simulation of a series of controls in the actual control system 5 has been completed.

If it is determined in operation S07 that the simulation of the series of controls in the actual control system 5 has not been completed, the simulation device 100 executes operations S08, S09, S11, S12, S13, and S14. In operation S08, the communication data transfer unit 132 transfers the communication data to the storage area adjacent downstream in the communication buffer 150. In operation S09, the communication data storage unit 133 stores communication data generated by the transmission side simulator in the storage area on the most upstream side of the communication buffer 150 for each of a plurality of communication definitions. In operation S11, the communication data reading unit 134 reads the communication data transferred to the most downstream storage area by the communication data transfer unit 132 and controls the reception side simulator to acquire the communication data for each of the plurality of communication definitions.

In operation S12, the data accumulation unit 181 acquires simulation results by the simulators 101, 102A, 102B, and 102C from the simulation manager 110, acquires simulation results of operations of a plurality of machines 3 from the operation simulation unit 122, and controls the virtual data storage unit 202 to accumulate the simulation results. In operation S13, the progress speed adjustment unit 171 and the suspension unit 172 execute playback speed adjustment processing. Contents of operation S13 will be described later. In operation S14, the counter 111 counts up the number of simulation cycles. The simulation device 100 then returns the processing to operation S02. The simulation device 100 repeats the above simulation cycle until the simulation of a series of controls in the actual control system 5 is completed.

If it is determined in operation S07 that the simulation of the series of controls in the actual control system 5 has been completed, the simulation procedure by the simulation device 100 is completed.

Figure 11:
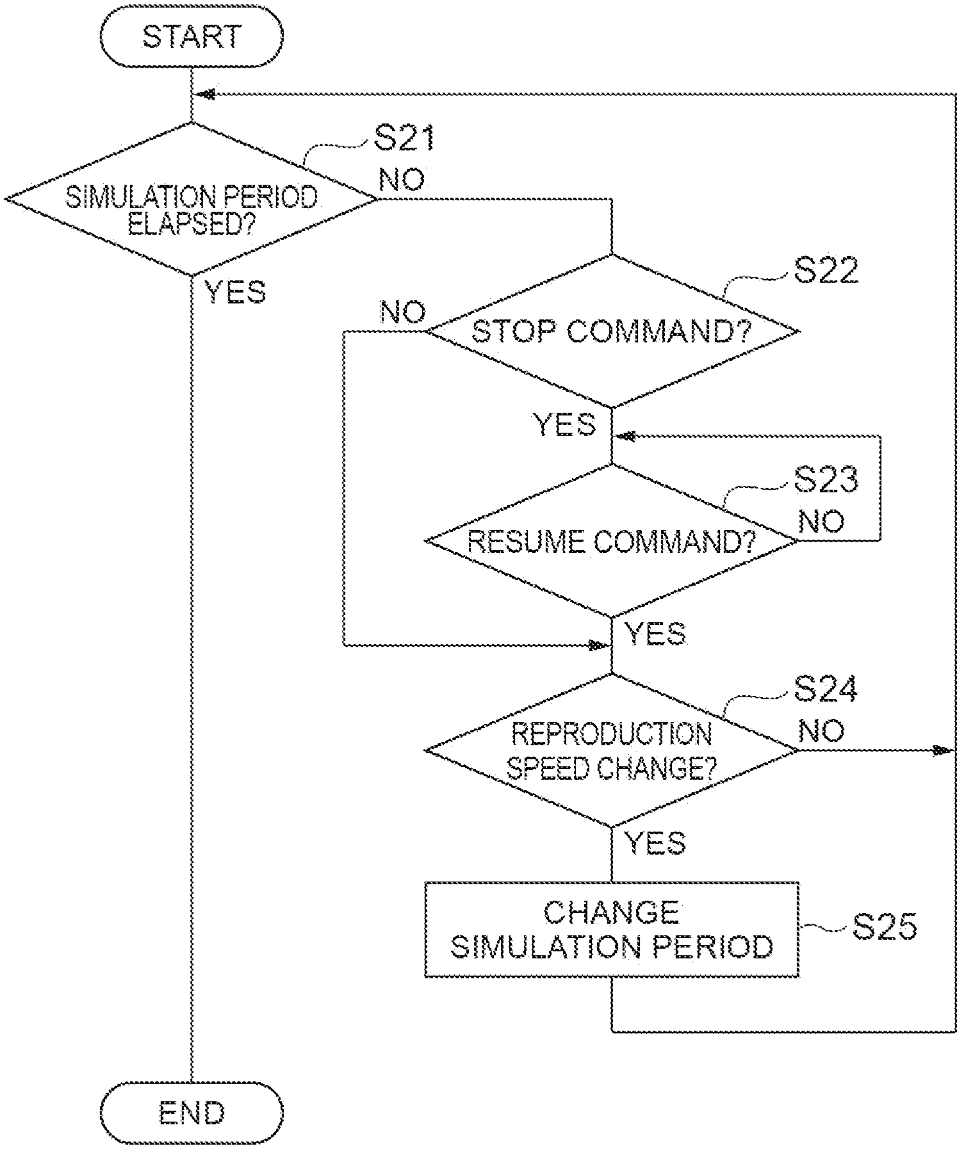
FIG. 11 is a flowchart illustrating an example playback speed adjustment procedure.

FIG. 11 is a flowchart illustrating the procedure of the playback speed adjustment process in operation S13. As illustrated in FIG. 11, the simulation device 100 first executes operation S21. In operation S21, the progress speed adjustment unit 171 checks whether the simulation cycle has elapsed after the number of simulation cycles reaches the current value.

If it is determined in operation S21 that the simulation cycle has not elapsed, the simulation device 100 executes operation S22. In operation S22, the suspension unit 172 checks whether a stop command is input. If it is determined in operation S22 that the stop command is input, the simulation device 100 executes operation S23. In operation S23, the suspension unit 172 waits for input of a restart command. As a result, counting of the number of cycles by the counter 111 is suspended until the restart command is input, and the simulation by the simulators 101 and 102 is suspended.

Next, the simulation device 100 executes operation S24. If it is determined in operation S22 that the stop command is not input, the simulation device 100 executes operation S23 without executing operation S24. In operation S24, the progress speed adjustment unit 171 checks whether a playback speed designation is input.

If it is determined in operation S24 that playback speed has been designated, the simulation device 100 executes operation S25. In operation S25, the progress speed adjustment unit 171 changes the simulation cycle in accordance with the designation of playback speed. The simulation device 100 then returns the processing to operation S21. If it is determined in operation S24 that playback speed has not been designated, the simulation device 100 returns the processing to operation S25 without executing operation S21. Thereafter, the above processing is repeated until the simulation period elapses. If it is determined in operation S21 that the simulation cycle has elapsed, the playback speed adjustment process is completed.

Figure 12:
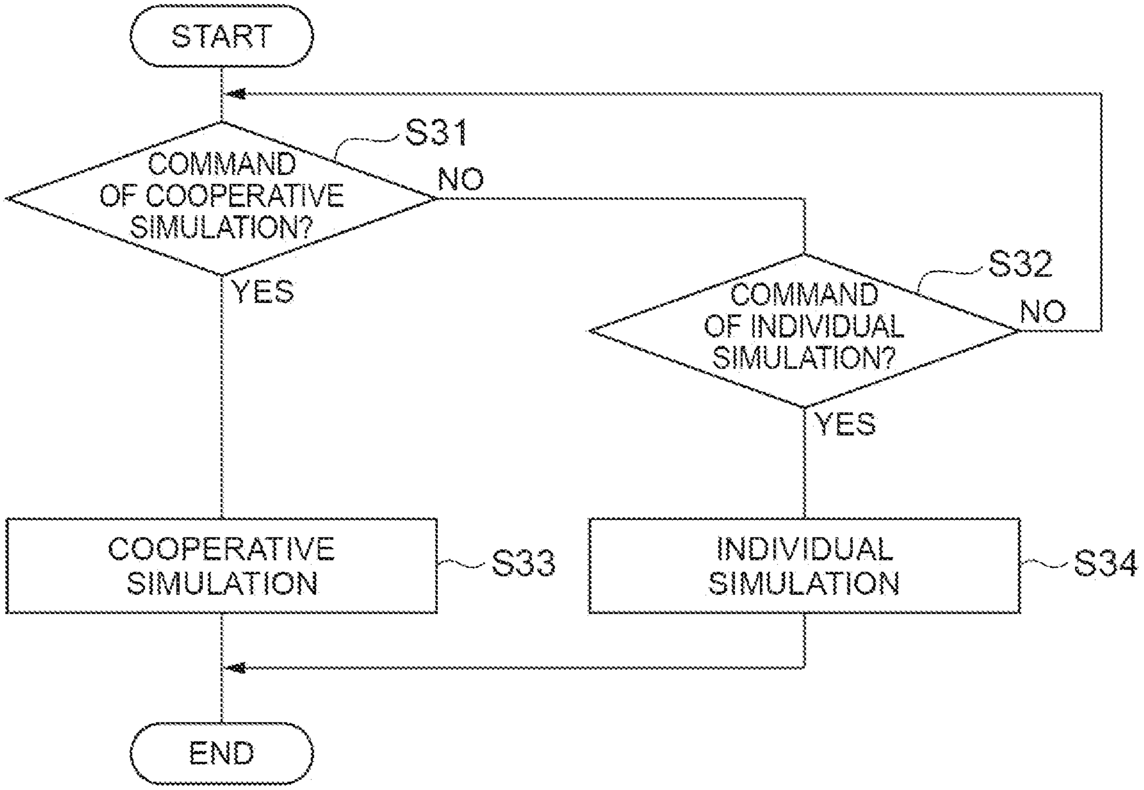
FIG. 12 is a flowchart showing a modification of the simulation procedure.

FIG. 12 is a flowchart illustrating a modification of the simulation procedure. This modification illustrates a procedure in which the simulation device 100 selectively executes collaborative simulation and individual simulation. As illustrated in FIG. 12, the simulation device 100 first executes operation S31. In operation S31, the simulation manager 110 checks whether a designation for collaborative simulation is input to the input device 195 or the like.

If it is determined in operation S31 that the designation of the cooperation simulation is not input to the input device 195 or the like, the simulation device 100 executes operation S32. In operation S32, the simulation manager 110 checks whether a designation of individual simulation is input to the input device 195 or the like. In operation S32, if it is determined that the designation of individual simulation is not input to the input device 195 or the like, the simulation device 100 returns the processing to operation S31.

If it is determined in operation S31 that the designation of the coordination simulation is input to the input device 195 or the like, the simulation device 100 executes operation S33. In operation S33, the simulation manager 110 controls the simulation of the simulators 101 and 102 to be executed cooperatively. The specific procedure of operation S33 is as illustrated in operations S01 to S14 in FIG. 10.

If it is determined in operation S32 that an designation of individual simulation has been input to the input device 195 or the like, the simulation device 100 executes operation S34. In operation S34, the simulation manager 110 executes individual simulation.

Figure 13:
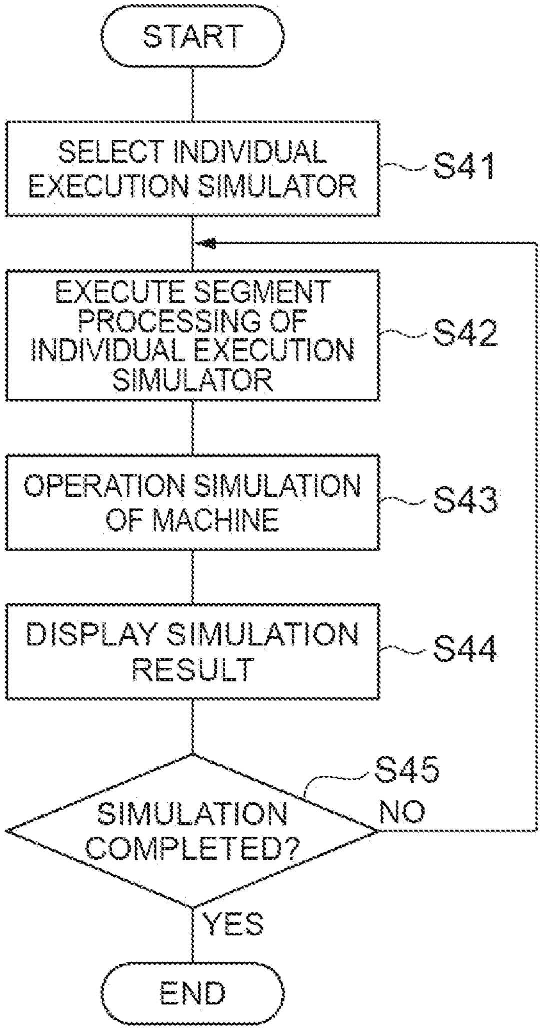
FIG. 13 is a flowchart illustrating an example individual simulation procedure.

FIG. 13 is a flowchart illustrating an individual simulation procedure in operation S34. As illustrated in FIG. 13, the simulation device 100 first executes operations S41, S42, S43, S44, and S45. In operation S41, the simulation manager 110 selects one individual executing simulator from the simulators 101 and 102 based on the designation of individual simulation.

In operation S42, the simulation manager 110 controls the individual executing simulator to execute the segment processing. In operation S43, the operation simulation unit 122 simulates the operation of the machine 3 corresponding to the individual executing simulator based on the simulation result by the individual executing simulator.

In operation S44, the operation simulation unit 122 generates a simulation image of the operation of the machine 3 based on the simulation result of the operation of the machine 3 corresponding to the individual executing simulator, and displays the simulation image on the display device 196 or the like. In operation S45, the simulation manager 110 checks whether simulation of a series of controls by the controller corresponding to the individual executing simulator is completed.

If it is determined in operation S45 that the simulation of a series of controls by the controller corresponding to the individual executing simulator is not completed, the simulation device 100 returns the processing to operation S42. If it is determined in operation S45 that the simulation of a series of controls by the controller corresponding to the individual executing simulator is completed, the individual simulation is completed.

Procedure for Adjusting Virtual Delay Time

Figure 14:
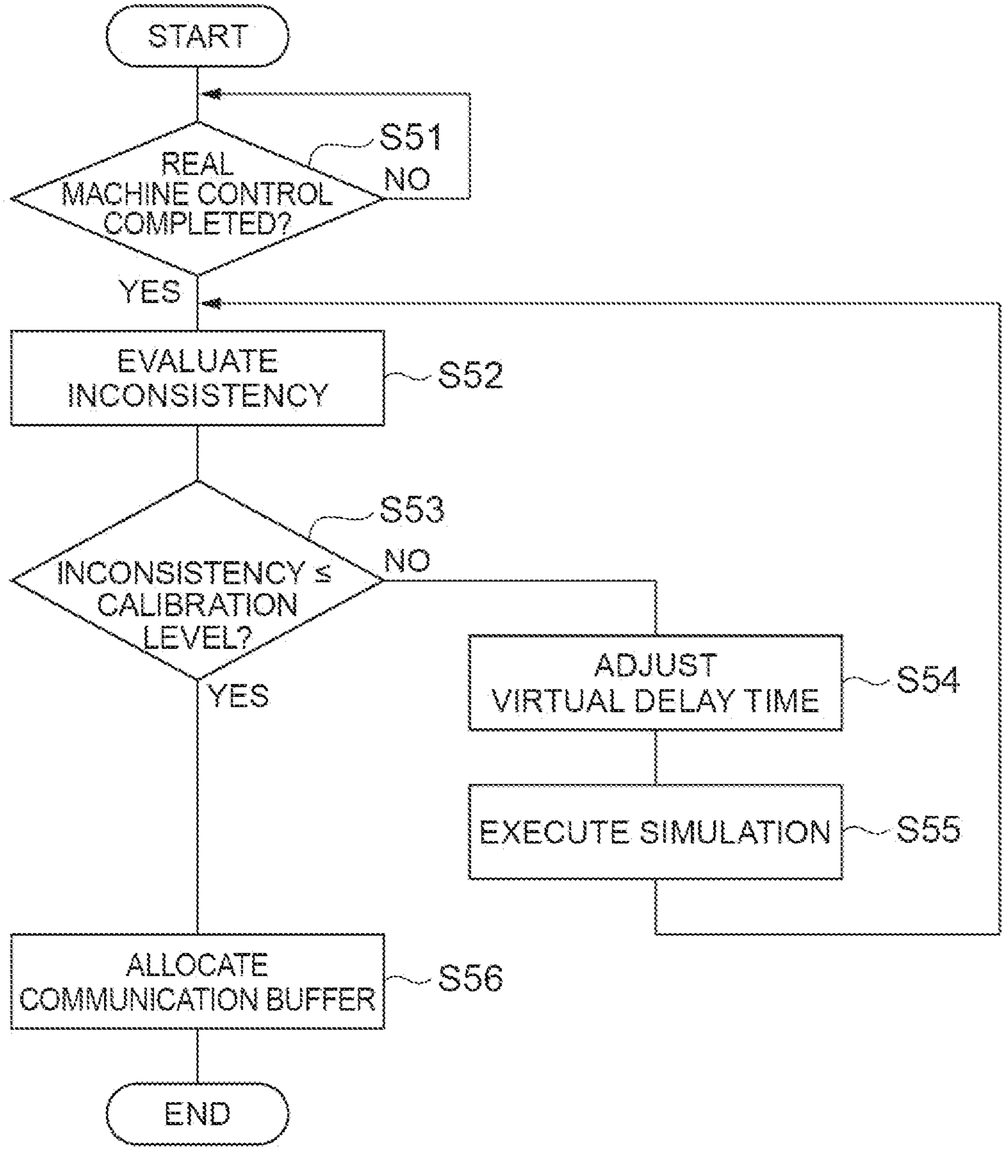
FIG. 14 is a flowchart illustrating an example procedure for adjusting virtual delay time.

Next, an example adjustment procedure of the virtual delay time executed based on the simulation result will be described. As illustrated in FIG. 14, the data collection device 200 first executes operations S51 and S52. In operation S51, the inconsistency evaluation unit 203 waits for the control by the actual control system 5 to be completed and real data to be accumulated in the real data storage unit 201. In operation S52, the inconsistency evaluation unit 203 evaluates the inconsistency between the virtual data and the real data.

Next, the simulation device 100 executes operation S53. In operation S53, the virtual delay setting unit 144 checks whether the evaluation result of the degree of inconsistency evaluated by the inconsistency evaluation unit 203 is equal to or lower than the calibration level.

If it is determined in operation S53 that the evaluation result of the degree of inconsistency is not equal to or lower than the calibration level, the simulation device 100 executes operations S54 and S55. In operation S54, the virtual delay setting unit 144 changes the virtual delay time for each of the plurality of communication definitions so as to reduce the degree of inconsistency. In operation S55, the virtual delay setting unit 144 controls the simulation device 100 to execute a series of simulations of control by the actual control system 5 again. The simulation device 100 then returns the processing to operation S52.

If it is determined in operation S53 that the evaluation result of the degree of inconsistency is equal to or lower than the calibration level, the simulation device 100 executes operation S56. In operation S56, the communication buffer allocation unit 143 allocates a communication buffer having a size corresponding to the virtual delay time set by the virtual delay setting unit 144 to each of the plurality of communication definitions. Thus, the virtual delay time adjustment procedure is completed.

Anomaly Detection Procedure

Figure 15:
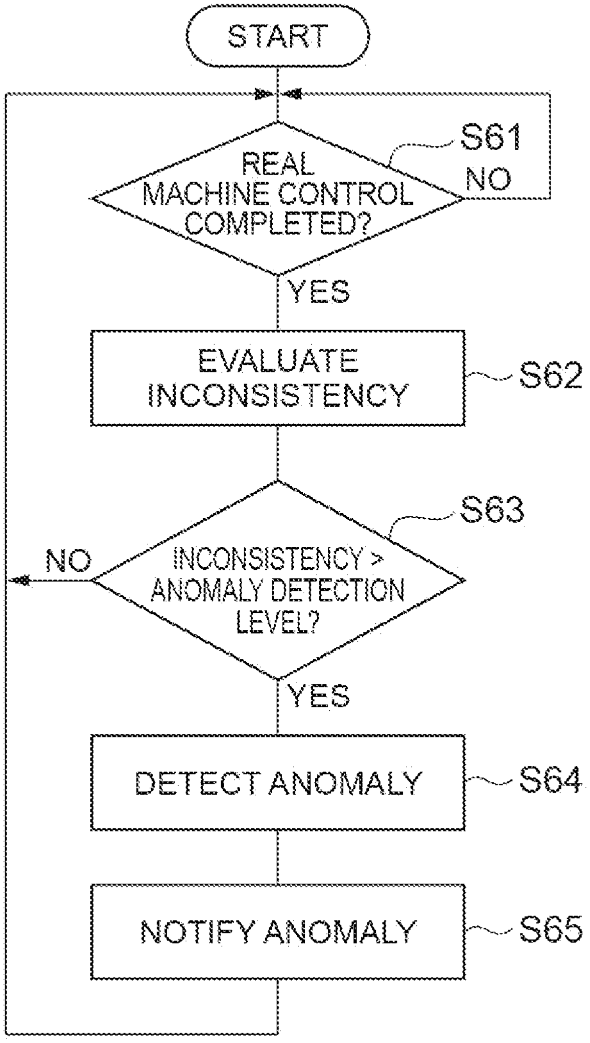
FIG. 15 is a flowchart illustrating an example anomaly monitoring procedure.

Next, an example anomaly detection procedure by the data collection device 200 will be described. As illustrated in FIG. 15, the data collection device 200 first executes operations S61, S62, and S63. In operation S61, the inconsistency evaluation unit 203 waits for the control by the actual control system 5 to be completed and real data to be accumulated in the real data storage unit 201. In operation S62, the inconsistency evaluation unit 203 evaluates the inconsistency between the virtual data and the real data. In operation S63, the anomaly detection unit 204 checks whether the evaluation result of the degree of inconsistency evaluated by the inconsistency evaluation unit 203 exceeds the anomaly detection level.

If it is determined in operation S63 that the evaluation result of the degree of inconsistency does not exceed the anomaly detection level, the data collection device 200 returns the processing to operation S61. Thereafter, the evaluation of the inconsistency between the virtual data and the real data is repeated until the evaluation result of the inconsistency exceeds the anomaly detection level.

If it is determined in operation S63 that the evaluation result of the degree of inconsistency exceeds the anomaly detection level, the data collection device 200 executes operations S64 and S65. In operation S64, the anomaly detection unit 204 detects an anomaly of the actual control system 5. In operation S65, the anomaly detection unit 204 notifies the anomaly of the actual control system 5 by display on the display devices 196 and 296 or the like. At this time, the comparison image generation unit 205 may generate a comparison image for comparing the progress of the control by the controllers 6 and 7 and the progress of the simulation by the simulators 101 and 102 are compared with each other, and display the comparison image in the display devices 196 and 296 or the like described below.

As described above, the simulation device 100 includes: a first simulator configured to simulate control of a first machine by a first controller; a second simulator configured to simulate control of a second machine by a second controller; and a simulation manager 110 configured to control progress of simulation by the first simulator and progress of simulation by the second simulator so as to correspond to relation between progress of control by the first controller and progress of control by the second controller.

With this the simulation device 100, even in non-real-time simulation executed at elapsed time different from real time, the relation between the progress of simulation by the first simulator and the progress of simulation by the second simulator can be readily made to correspond to the relation between the progress of control of the first machine by the first controller and the progress of control of the second machine by the second controller. Accordingly, the relation between the operation of the first machine and the operation of the second machine may be readily reproduced in the simulation space. Therefore, cooperative operation by a plurality of devices may be readily simulated.

The simulation manager 110 may control execution timing of a first segment processing repeated by the first simulator and execution timing of a second segment processing repeated by the second simulator so as to correspond to relation between execution timing of the first segment processing repeated under control of the first controller and execution timing of the second segment processing repeated under control of the second controller. The progress of the simulation can readily be adjusted.

The simulation manager 110 may control execution timing of the first segment processing repeated by the first simulator and execution timing of the second segment processing repeated by the second simulator based on a first control period representing a repetition period of the first segment processing by the first controller and a second control period representing a repetition period of the second segment processing by the second controller. Even when the first control period and the second control period are different from each other, the progress of simulation can readily be adjusted.

The simulation manager may include: a counter 111 configured to count the number of simulation cycles; a selection unit 113 configured to select at least one of the first simulator and the second simulator based on the first control period and the second control period and the number of simulation cycles; and an execution unit 114 configured to control each of the at least one simulator selected by the selection unit 113 to execute segment processing. The progress of simulation may readily be adjusted in accordance with the difference between the first control period and the second control period.

The selection unit 113 may select the first simulator when the number of simulation cycles counted after the previous execution of the first segment processing becomes the number of simulation cycles corresponding to the first control period, and select the second simulator when the number of simulation cycles counted after the previous execution of the second segment processing becomes the number of simulation cycles corresponding to the second control period. The progress of simulation may readily be adjusted in accordance with the difference between the first control period and the second control period.

Both of the number of simulation cycles corresponding to the first control period and the number of simulation cycles corresponding to the second control period may be one or more. The progress of simulation can more accurately be adjusted.

The simulation device 100 may further include an operation simulation unit 122 configured to simulate the operation of the first machine and the operation of the second machine based on a simulation result by the first simulator and a simulation result by the second simulator. The simulation result can readily be used for virtual operation confirmation of the first machine and the second machine.

The operation simulation unit 122 may simulate the operation of the first machine and the operation of the second machine after both the simulation result by the first simulator and the simulation result by the second simulator are updated. The simulation image can efficiently be generated.

The second simulator may simulate control of the second machine by the second controller so as to coordinate a simulation result of an operation of the second machine with a simulation result of an operation of the first machine by the first simulator. Adjustment of the progress of simulation is more useful.

The simulation device 100 may further include a communication simulator 130 configured to transfer communication data between the first simulator and the second simulator so as to reproduce communication executed directly or indirectly between the first controller and the second controller. The relation between the control of the first machine by the first controller and the control of the second machine by the second controller can more accurately be simulated.

The communication simulator 130 may control the reception side simulator to acquire the communication data generated by the transmission side simulator at a timing based on a predetermined virtual delay time. The relation between the control of the first machine by the first controller and the control of the second machine by the second controller can more accurately be simulated.

The communication simulator 130 may include: a communication counter 131 configured to count the number of communication cycles; a communication data storage unit 133 configured to store communication data generated by a transmission side simulator in the communication buffer 150; and a communication data reading unit configured to, when the number of communication cycles counted after communication data is stored in the communication buffer 150 becomes the number of communication cycles corresponding to a virtual delay time, read out the communication data stored in a communication buffer and control a reception side simulator to acquire the communication data. The communication delay can be readily simulated even in the non-real-time simulation.

The communication buffer 150 may include a plurality of storage areas arranged from upstream to downstream in the data transfer direction. The communication data storage unit 133 may store the communication data generated by the transmission side simulator in the storage area of the most upstream of the communication buffer. The communication simulator 130 may further include the communication data transfer unit 132 that transfers communication data to a storage area adjacent downstream in the communication buffer every time the number of communication cycles is counted. The communication data reading unit 134 may read the communication data transferred up to the most downstream storage area by the communication data transfer unit 132 and control the reception side simulator to acquire the communication data. The communication delay can more readily be simulated.

The communication buffer 150 may include a plurality of storage areas 151, 152, 153, and 154, corresponding to the virtual delay time. The communication delay can more accurately be simulated.

The communication simulator 130 may execute, for each of a plurality of communication definitions 160 respectively associating the transmission side simulators with the reception side simulators, acquiring the communication data from the transmission side simulator and controlling the reception side simulator to acquire the communication data, based on the plurality of the communication definitions 160. Since the plurality of communications can be simulated collectively, control including the plurality of communications may readily be simulated.

Each of the plurality of the communication definition 160 may include the virtual delay time 163 from the transmission side simulator to the reception side simulator. The communication simulator 130 may control the reception side simulator to acquire communication data generated by the transmission side simulator at timing based on the virtual delay time 163 for each of the plurality of communication definitions. Control including a plurality of communications can more accurately be simulated.

The simulation device 100 may further include a communication buffer allocation unit 143 configured to allocate a communication buffer having a size corresponding to the virtual delay time 163 to each of the plurality of the communication definition 160. The communication simulator 130 may include: a communication counter 131 configured to count the number of communication cycles; a communication data storage unit 133 configured to store communication data generated by a transmission side simulator in the communication buffer 150 for each of a plurality of the communication definitions 160; and a communication data reading unit 134 configured to read out communication data stored in the communication buffer 150 and control a reception side simulator to acquire the communication data when the number of communication cycles counted after communication data is stored in the communication buffer 150 becomes the number of communication cycles corresponding to the virtual delay time 163 for each of a plurality of the communication definitions 160. The communication delay for each of the plurality of communications may readily be simulated.

The simulation device 100 may further include a progress speed adjustment unit 171 configured to change the progress speed of the simulation by the first simulator and the progress speed of the simulation by the second simulator in response to the designated playback speed. The simulation result can be more effectively utilized by freely adjusting the simulation speed.

The simulation device 100 may further include a suspension unit 172 configured to suspend simulation by the first simulator and simulation by the second simulator in response to a stop command. In this case, the simulation result can be conveniently utilized by making it available to freely suspend the simulation.

When receiving the designation of the individual simulation, the simulation manager 110 may select one individual executing simulator from the first simulator and the second simulator and execute the simulation by the individual executing simulator regardless of the progress of the simulation by the other simulator. Individual operation and cooperative operation can be simulated in stages.

The control system 4 may include: a simulation device 100 including the communication simulator 130 configured to control a reception side simulator to acquire communication data generated by a transmission side simulator at a timing based on a predetermined virtual delay time; the actual control system 5 including a first controller and a second controller; and the virtual delay setting unit 144 configured to adjust the virtual delay time 163 to correspond to a communication delay time between the first controller and the second controller. The relation between the operation of the first machine and the operation of the second machine can readily and accurately be reproduced in the simulation space.

The control system 4 may further include the anomaly detection unit 204 that detects an anomaly in the actual control system 5 based on a comparison between a progress of control of the first machine by the first controller, a progress of control of the second machine by the second controller, a progress of simulation by the first simulator, and a progress of simulation by the second simulator. The anomaly of the actual control system 5 can be quickly detected by comparison with simulation tuned to the actual control system 5.

The control system 4 may include: the simulation device 100; the actual control system 5 including the first controller and the second controller; and a comparison image generation unit 205 configured to generate a comparison image for comparing progress of control of the first machine by the first controller, progress of control of the second machine by the second controller, progress of simulation by the first simulator, and progress of simulation by the second simulator. By providing an interface that facilitates visual confirmation of the relation between the progress of control of the first machine by the first controller, the progress of control of the second machine by the second controller, the progress of simulation by the first simulator, and the progress of simulation by the second simulator, manual tuning of simulation conditions and visual anomaly detection can be prompted.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A simulation device comprising circuitry configured to:

execute a first simulation of a first control of a first machine, wherein the first control is executed by a first controller;

execute a second simulation of a second control of a second machine, wherein the second control is executed by a second controller so that the second machine operates in collaboration with the first machine; and control progress of the first simulation and progress of the second simulation to maintain a simulated ratio of a progress speed of the first simulation and a progress speed of the second simulation to be equal to a ratio of a progress speed of the first control and a progress speed of the second control, wherein the first control includes a first set of cycles and the first controller is configured to execute each of the first set of cycles after a first control period, wherein the second control includes a second set of cycles and the second controller is configured to execute each of the second set of cycles after a second control period, and wherein the circuitry is configured to control the progress of the first simulation and the progress of the second simulation by:

counting a number of simulation cycles;

selecting the first simulation in response to determining that the number of simulation cycles becomes a number corresponding to the first control period;

selecting the second simulation in response to determining that the number of simulation cycles becomes a number corresponding to the second control period;

executing one of the first set of cycles in response to a selection of the first simulation; and executing one of the second set of cycles in response to a selection of the second simulation.

2. The simulation device according to claim 1, wherein the circuitry is further configured to simulate an operation of the first machine and an operation of the second machine based on a result of the first simulation and a result of the second simulation.

3. The simulation device according to claim 2, wherein the circuitry is configured to simulate the operation of the first machine and the operation of the second machine in response to determining that both the result of the first simulation and the result of the second simulation are updated.

4. The simulation device according to claim 1, wherein the circuitry is further configured to simulate communication executed between the first controller and the second controller during execution of the first simulation and the second simulation.

5. The simulation device according to claim 4, wherein the circuitry is configured to:

generate communication data for the communication by executing at least a part of the first simulation; and acquire the generated communication data after a lapse of a predetermined virtual delay time to execute at least a part of the second simulation based on the acquired communication data.

6. The simulation device according to claim 5, wherein the circuitry is further configured to:

store, in a communication buffer, the communication data generated by executing at least the part of the first simulation;

count a number of communication cycles after the communication data is stored in the communication buffer; and acquire, in response to determining that the number of communication cycles becomes a number corresponding to the virtual delay time, the stored communication data to execute at least the part of the second simulation based on the acquired communication data.

7. The simulation device according to claim 6, wherein the communication buffer includes a plurality of storage areas arranged from an upstream end to a downstream end in a data transfer direction, and wherein the circuitry is configured to:

store the generated communication data in a storage area on the upstream end of the communication buffer;

transfer the communication data to an adjacent storage area along the data transfer direction every time the number of communication cycles is counted; and acquire the communication data transferred to a storage area on the downstream end in the communication buffer to execute at least the part of the second simulation based on the acquired communication data.

8. The simulation device according to claim 7, wherein the communication buffer includes the plurality of storage areas a number of which corresponds to the virtual delay time.

9. The simulation device according to claim 4, wherein the circuitry is configured to, based on a plurality of communication definitions each of which associates a transmission side simulation with a reception side simulation, acquire communication data generated by executing at least a part of the transmission side simulation to execute at least a part of the reception side simulation based on the acquired communication data, according to each of the plurality of communication definitions.

10. The simulation device according to claim 1, wherein the circuitry is further configured to change the progress speed of the first simulation and the progress speed of the second simulation in response to a designation of playback speed.

11. The simulation device according to claim 1, wherein the circuitry is further configured to suspend the first simulation and the second simulation in response to a suspension command.

12. The simulation device according to claim 1, wherein the circuitry is configured to, in response to receiving a designation of individual simulation, execute the first simulation regardless of the progress of the second simulation.

13. A control system comprising:

the simulation device according to claim 5; and the first controller and the second controller, wherein the circuitry is further configured to set the virtual delay time to correspond to a communication delay time between the first controller and the second controller.

14. The control system according to claim 13, wherein the circuitry is further configured to detect an anomaly in the first controller and the second controller based on a comparison between the progress speed of the first control, the progress speed of the second control, the progress speed of the first simulation, and the progress speed of the second simulation.

15. A control system comprising:

the simulation device according to claim 1; and the first controller and the second controller, wherein the circuitry is further configured to generate a comparison image that compares the progress speed of the first control, the progress speed of the second control, the progress speed of the first simulation, and the progress speed of the second simulation.

16. The simulation device according to claim 1, wherein the circuitry is further configured to:

execute each of the first set of cycles without waiting for a completion of the first control period in the first simulation; and execute each of the second set of cycles without waiting for a completion of the second control period in the second simulation.

17. A simulation method comprising:

executing a first simulation of a first control of a first machine, wherein the first control is executed by a first controller;

executing a second simulation of a second control of a second machine, wherein the second control is executed by a second controller so that the second machine operates in collaboration with the first machine; and controlling progress of the first simulation and progress of the second simulation to maintain a simulated ratio of a progress speed of the first simulation and a progress speed of the second simulation to be equal to a ratio of a progress speed of the first control and a progress speed of the second control, wherein the first control includes a first set of cycles and the first controller is configured to execute each of the first set of cycles after a first control period, wherein the second control includes a second set of cycles and the second controller is configured to execute each of the second set of cycles after a second control period, and wherein said controlling the progress of the first simulation and the progress of the second simulation includes:

counting a number of simulation cycles;

selecting the first simulation in response to determining that the number of simulation cycles becomes a number corresponding to the first control period;

selecting the second simulation in response to determining that the number of simulation cycles becomes a number corresponding to the second control period;

executing one of the first set of cycles in response to a selection of the first simulation; and executing one of the second set of cycles in response to a selection of the second simulation.

18. The simulation method according to claim 17, wherein said controlling the progress of the first simulation and the progress of the second simulation further includes changing the progress speed of the first simulation and the progress speed of the second simulation in response to a designation of playback speed.

19. The simulation method according to claim 17, further comprising suspending the first simulation and the second simulation in response to a suspension command.

20. A simulation device comprising circuitry configured to:

execute a first simulation of a first control of a first machine, wherein the first control is executed by a first controller;

execute a second simulation of a second control of a second machine, wherein the second control is executed by a second controller so that the second machine operates in collaboration with the first machine;

control progress of the first simulation and progress of the second simulation to maintain a simulated ratio of a progress speed of the first simulation and a progress speed of the second simulation to be equal to a ratio of a progress speed of the first control and a progress speed of the second control; and change the progress speed of the first simulation and the progress speed of the second simulation in response to a designation of playback speed.

* * * * *